US010810793B2

(12) United States Patent
Elber

(10) Patent No.: US 10,810,793 B2
(45) Date of Patent: Oct. 20, 2020

(54) MICROSTRUCTURES AND POROUS GEOMETRY MODELING

(71) Applicant: Technion Research & Development Foundation Limited, Haifa (IL)

(72) Inventor: Gershon Elber, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 15/919,705

(22) Filed: Mar. 13, 2018

(65) Prior Publication Data

US 2018/0261008 A1 Sep. 13, 2018

Related U.S. Application Data

(60) Provisional application No. 62/470,399, filed on Mar. 13, 2017.

(51) Int. Cl.
| | | |
|---|---|---|
| *G06T 17/00* | (2006.01) | |
| *G06T 17/10* | (2006.01) | |
| *G06T 17/20* | (2006.01) | |
| *B29C 64/393* | (2017.01) | |
| *B33Y 10/00* | (2015.01) | |
| *B33Y 50/02* | (2015.01) | |
| *B33Y 50/00* | (2015.01) | |

(52) U.S. Cl.
CPC ............ *G06T 17/10* (2013.01); *B29C 64/393* (2017.08); *G06T 17/20* (2013.01); *B33Y 10/00* (2014.12); *B33Y 50/00* (2014.12); *B33Y 50/02* (2014.12)

(58) Field of Classification Search
USPC ........................................................ 345/420
See application file for complete search history.

(56) References Cited

U.S. PATENT DOCUMENTS

| | | | |
|---|---|---|---|
| 6,313,837 B1 | 11/2001 | Assa et al. | |
| 7,996,101 B2 * | 8/2011 | Menchik ................. | B41J 2/175 700/119 |
| 9,972,128 B2 * | 5/2018 | Gregson ................. | G06T 17/20 |
| 10,108,752 B2 | 10/2018 | Maisonneuve | |
| 10,366,535 B2 | 7/2019 | Huang et al. | |
| 2006/0290695 A1 | 12/2006 | Salomie | |
| 2015/0038860 A1 * | 2/2015 | Fonte ....................... | A61B 6/50 600/505 |
| 2015/0298423 A1 * | 10/2015 | Holemans ................. | B32B 5/18 244/133 |

(Continued)

OTHER PUBLICATIONS

Lu, A., Interactive Volume Illustration Using Wang Cubes, Technical Report, 2004 [online], [retrieved on May 21, 2019]. Retrieved from the Internet <URL:https://pdfs.semanticscholar.org/b390/218e7fad9b384c6bed00c6b025e8e781e7ae.pdf> (Year: 2004).*

(Continued)

*Primary Examiner* — Gordon G Liu

(57) ABSTRACT

Methods for modeling a 3-dimensional (3D) object, comprising operating at least one hardware processor for, receiving a 3D volumetric model of the object, receiving a 3D model of a tile, paving multiple ones of the tiles in the interior domain of the 3D volumetric model, and providing a 3D filled model of the filled inner volume of the 3D volumetric model are provided. Computer program products and systems for doing same are also provided.

27 Claims, 25 Drawing Sheets
(19 of 25 Drawing Sheet(s) Filed in Color)

(56) References Cited

U.S. PATENT DOCUMENTS

| | | |
|---|---|---|
| 2016/0224693 A1 | 8/2016 | Maisonneuve |
| 2017/0116779 A1* | 4/2017 | Lalish .................... G06T 15/04 |
| 2018/0275637 A1 | 10/2018 | Elber et al. |
| 2018/0373816 A1 | 12/2018 | Maisonneuve |

OTHER PUBLICATIONS

Derose, T., etc. "Functional Composition Algorithms via Blossoming" (ACM Transactions on Graphics, Nov. 1995), [online], [retrieved on Feb. 5, 2020]. Retrieved from the Internet <URL: http://citeseerx.ist.psu.edu/viewdoc/download?doi=10.1.1.332.2123&rep=rep1&type=pdf> (Year: 1993).*

Restriction Official Action dated Jul. 31, 2019 From the US Patent and Trademark Office Re. U.S. Appl. No. 15/985,846. (7 pages).

Official Action dated Dec. 12, 2019 From the US Patent and Trademark Office Re. U.S. Appl. No. 15/985,846. (11 pages).

\* cited by examiner

MICROSTRUCTURES AND POROUS GEOMETRY MODELING

CROSS REFERENCE TO RELATED APPLICATIONS

This application claims the benefit of priority of U.S. Provisional Patent Application No. 62/470,399, filed Mar. 13, 2017, entitled "Precise Construction of Micro-structures and Porous Geometry via Functional Composition", the contents of which are incorporated herein by reference in their entirety.

FIELD OF INVENTION

The present invention is in the field of 3D modeling.

BACKGROUND OF THE INVENTION

Deformations and metamorphosis captured the attention of the computer graphics and the geometric modeling communities for several decades, while in recent years this interest has reduced a bit. The idea of freeform deformations (FFD) was introduced around thirty years ago as a global deformation mapping, M: $R^3 \rightarrow R^3$, and was originally based on trivariate tensor-product Bézier vector functions. Trivariate splines were investigated by many and herein we will only survey the use of trivariates toward deformations.

A large body of work has been presented on a variety of FFD techniques, including extensions that support the B-spline representation and use of FFDs in animation. While, in general, FFDs map a box-shaped domain into a deformed-box in Euclidean space, other topologies were considered including Extended FFDs to form a deformation that better resembles the shape of the input model. Use of prismatic and cylindrical FFD functions that can approximate some geometric models better than box-shaped tensor product FFDs have been proposed. More general FFDs suggested the use of arbitrary topology FFDs based on subdivision volumes for free-form deformation.

Other, more recent, variations of FFDs considered the removal of certain topological restrictions from the deformed object. Torn surfaces that incorporated non-isoparametric curves of $C^{-1}$ discontinuity inside B-spline surfaces have been considered. Similarly, the exploitation of discontinuous FFDs to induce tears in the deformed models for animation and surgery incision simulations has also been considered.

While the body of FFD work is significant, FFDs were mostly seen as manipulation tools of existing geometry. Almost exclusively, FFDs were applied to an existing model, resulting in a modified, deformed, model, that typically, and aside from the discussed torn surfaces abilities, preserved the topology. Also, in the last decade or so, surface detailing techniques where introduced that are volumetric but limited to a surface layer (between the surface and its small offset, with typically a linear interpolation in between) allowing the modeling of surface details like scales or thorns. Similar surface detailing abilities can also be found nowadays in commercial packages like Rhinoceros, of Robert McNeel & Associates, Seattle, Wash., USA.

Other efforts toward the synthesis of porous geometry and modeling with porosity are known and, for example, include stochastic methods and the use of Boolean set operations, including voxels' based. In Xiao, F., and Yin, X. Geometry models of porous media based on voronoi tessellations and their porosity-permeability relations, *Computers and Mathematics with Applications* 72 (2016), 328-348, the 3D Voronoi diagram of a set of points serves as the basis of the pore space, thickening the Voronoi edges and/or walls, and in Pasko, A., et al., Procedural function-based modelling of volumetric microstructures, *Graphical Models* 73, 5 (2011), 165-181, procedural (implicit) forms are employed toward the synthesis of micro-structures while also allowing for deformations and blendings. In Armillotta, A., and Pelzer, R., Modeling of porous structures for rapid prototyping of tissue engineering scaffolds, *Int. J. Adv. Manuf. Technol.* 39 (2008), 501-511, porous modeling of scaffolds is considered toward 3D printing, where a volumetric grid-like model is synthesized to follow the basic input scaffold. These methods typically synthesize piecewise constant (i.e. voxels) and linear porous geometry and are hence of limited continuity, and are further incapable of precisely controlling the geometry that is being synthesize.

A modeling constructor of porous and/or micro-structure geometry that smoothly and precisely builds the geometry does not as of yet exist. Further, it is greatly needed for the micro-structures' results to be fully piecewise-parametric.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

The present invention provides methods for modeling a 3-dimensional (3D) object, comprising operating at least one hardware processor for, receiving a 3D volumetric model of the object, receiving a 3D model of a tile, paving multiple ones of the tiles in the interior domain of the 3D volumetric model, and providing a 3D filled model of the filled inner volume of the 3D volumetric model are provided. Computer program products and systems for doing same are also provided.

According to a first aspect, there is provided a method for modeling a three-dimensional (3D) object, comprising operating at least one hardware processor for: receiving a 3D volumetric model of the object, wherein the 3D volumetric model is embodied in a digital file; receiving a 3D model of a tile, wherein the 3D model of the tile is embodied in a digital file; paving multiple ones of the tile in the interior domain of the 3D volumetric model, to fill at least a portion of the inner volume of the domain of the 3D volumetric model; and providing a 3D filled model of the filled inner volume of the 3D volumetric model, wherein the 3D filled model is embodied in a digital file.

According to another aspect, there is provided a computer program product for modeling a three-dimensional (3D) object, comprising a non-transitory computer-readable storage medium having program code embodied thereon, the program code executable by at least one hardware processor to: receive a 3D volumetric model of the object, wherein the 3D volumetric model is embodied in a digital file; receive a 3D model of a tile, wherein the 3D model of a tile is embodied in a digital file; pave multiple ones of the tiles in the interior domain of the 3D volumetric model, to fill at least a portion of the inner volume of the domain of the 3D volumetric model; and provide a 3D filled model of the filled inner volume of the 3D volumetric model, wherein the 3D filled model is embodied in a digital file.

According to another aspect, there is provide a system for manufacturing a three-dimensional (3D) object, comprising: a hardware processor; a storage medium comprising a computer program product of the invention; and a manufacturing apparatus capable of manufacturing a 3D object from the 3D filled model embodied in a digital file.

According to some embodiments, the receiving of the 3D volumetric model comprises receiving a 3D boundary model of the object and converting the 3D boundary model of the object into the 3D volumetric model. In some embodiments, the 3D volumetric model is a non-grid topology extended free form deformation (FFD).

According to some embodiments, the methods of the invention further comprise mathematical function composition with the 3D volumetric model; or mathematical points and vertices mapping of the set of paved tiles through the 3D volumetric model.

According to some embodiments, the 3D model of the tile comprises a 3D model of a microstructure to be repeated within the volume of the 3D object.

According to some embodiments, the 3D tile is heterogeneous. According to some embodiments, the 3D tile comprises a univariate curve, a trimmed bivariate surface, bivariate surface, a trimmed trivariate volume, a trivariate volume, a polyline, a polygon, a voxel, a tetrahedron or any combination thereof. According to some embodiments, the tile models at least one of color, texture, a material and a combination thereof.

According to some embodiments, the tile is a periodic tile, wherein the minimum and maximum of a dimension of the tile are equal. According to some embodiments, the paving is periodic paving and comprises direct contact between adjacent tiles.

According to some embodiments, the methods of the invention further comprise, closing a tile placed upon a boundary of the 3D volumetric model along the boundary. According to some embodiments, the closing comprises performing Boolean set operations. According to some embodiments, the closing is performed before the paving. According to some embodiments, the modeling comprises producing a watertight model.

According to some embodiments, the methods of the invention further comprise tessellation of the tile into a polygon.

According to some embodiments, the 3D filled model comprises a digital representation of at least two materials.

According to some embodiments, the paving comprises building a smooth 3D geometry without discontinuity. According to some embodiments, paving of multiple ones of the tile forms a regular, semi-regular or general tiling of 3D space. According to some embodiments, the paving comprises crossing a knot line in the 3D volumetric model and subdividing a tile at the crossed knot line.

According to some embodiments, a shape of a paved tile varies across the 3D volumetric model, wherein the shape of the tile is set to follow at least one physical constraint on the 3D volumetric model by optimizing or analyzing the model for the physical constraint. According to some embodiments, the optimizing or analyzing the model for the physical constraint comprises at least one of stress analysis, heat transfer analysis and shape optimization.

According to some embodiments, the tile is generated using the method of claim 1.

According to some embodiments, the methods of the invention further comprise: (a) transmitting the 3D filled model to a control unit of a manufacturing apparatus, and (b) producing the 3D object from the 3D filled model, by the manufacturing apparatus. According to some embodiments, the manufacturing apparatus is selected from the group consisting of: an apparatus for additive manufacturing, and an apparatus for composite manufacturing.

In addition to the exemplary aspects and embodiments described above, further aspects and embodiments will become apparent by reference to the figures and by study of the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE INVENTION

Figure 1A:
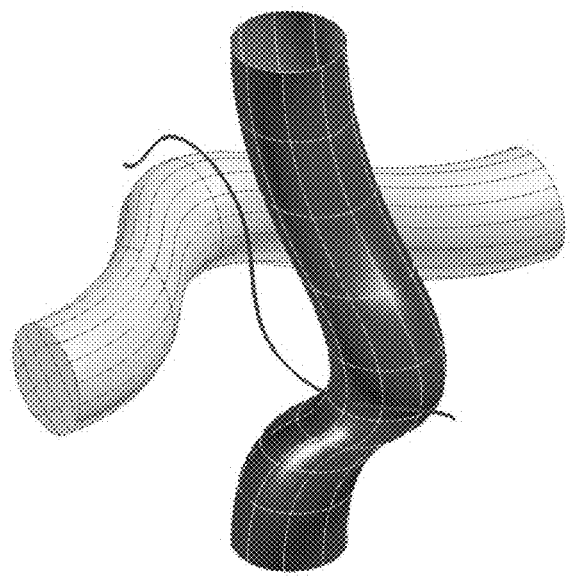
FIGS. 1A-1D: (1A) A simple example of a tile, T, consisting of three different geometric types: a curve (in blue), a surface (in red), and a trivariate (in green). (1B) T is paved (3×3×3) times in the domain of the mapping trivariate, M, the trivariate, is shown in 1C. (1D) An image of the precise smooth composition result of M(T).
Figure 1B:
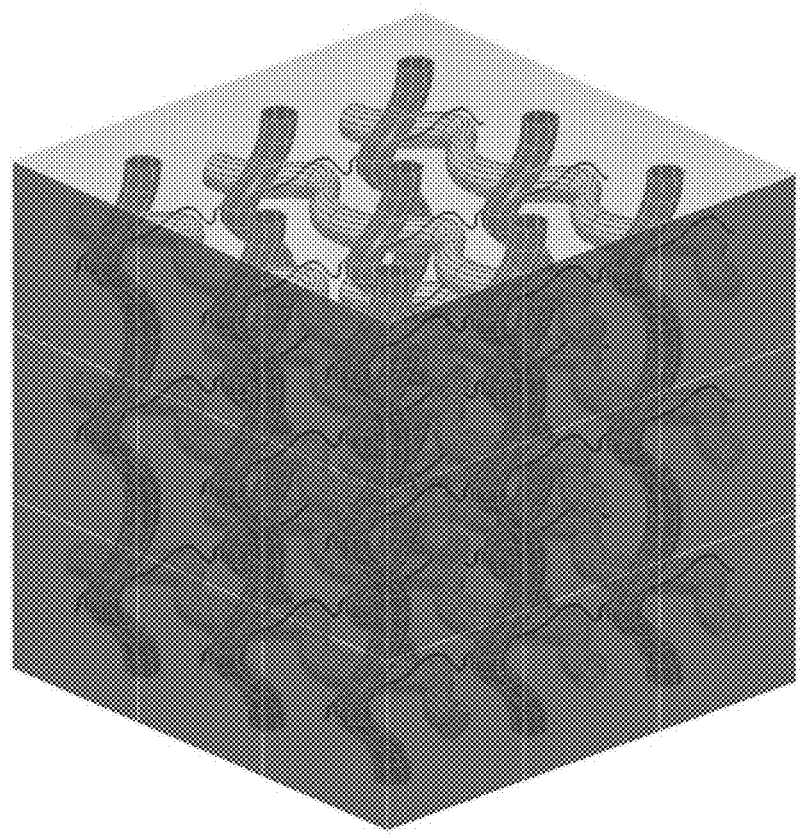
Figure 1C:
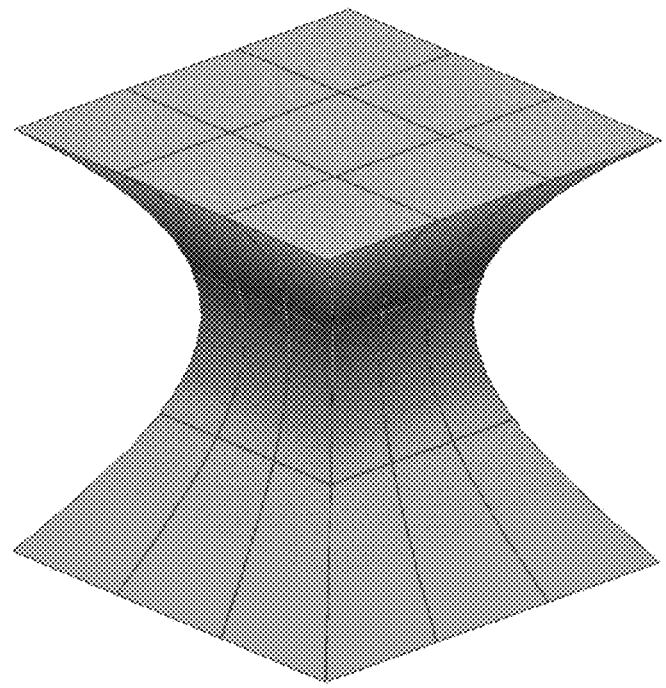
Figure 1D:
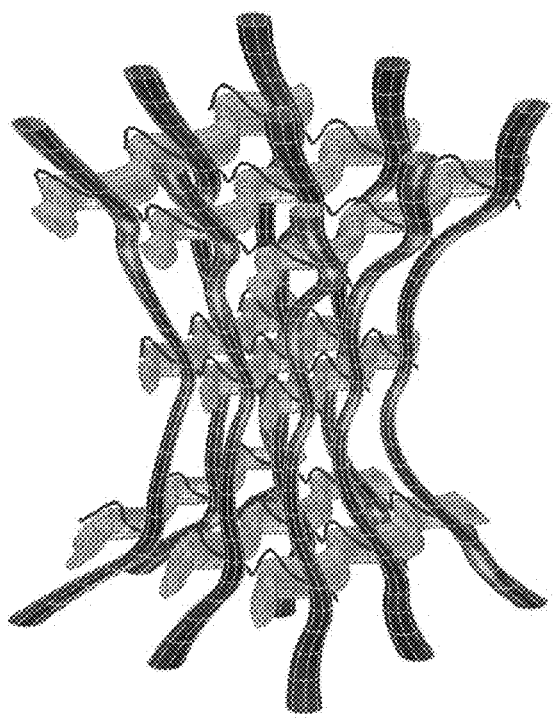

The present invention, in some embodiments, provides methods for modeling a three-dimensional (3D) object, comprising operating at least one hardware processor for, receiving a 3D volumetric model of the object, receiving a 3D model of a tile, paving multiple ones of the tile in the interior domain of the 3D volumetric model, and providing a 3D filled model of the filled inner volume of the 3D volumetric model. Computer program products and systems for doing same are also provided.

A constructor of a porous/micro-structure receives a volumetric model, M, as a trivariate and a geometric tile T, and paves the tile in the domain of M as desired, constructing a whole new topology of porous geometry in the general shape of M. The paved tiles are then mapped to Euclidean space via a composition with the volumetric model M.

The trivariate function M can be of any general shape. Techniques to build trivariate functions are known. The vast majority of tensor product surface constructors can be made into a trivariate constructors, including volumetric extrusions, ruled volumes or volumes of revolution, volumetric Boolean sums, and volumetric sweeps. With the clear ability to construct primitive shaped trivariates (i.e. cones and spheres), volumetric Boolean set operations over trivariates are now also demonstrated.

This disclosure demonstrates surface-trivariate compositions and 2-manifold micro-structures, as well as tiles consisting of univariates, (trimmed) bivariates, and even (trimmed) trivariates, including in combination in the same tile (See FIG. 1). Hence, one can manage non-manifold tiles as well as tiles consisting of multi-dimensional shapes. With the additional ability of supporting trivariate-trivariate composition, we form a closure: the resulting elements of the micro-structure are again trivariates and hence, can be recursively used in the construction of nano-structure, etc. Finally, we formalize the conditions over the mapping trivariate, M, and the tile so that the constructed model will be a viable k-manifold.

Let M be a trivariate Bézier vector function:

$$M(x,y,z)=\Sigma_{i_1=0}^{n_1}\Sigma_{i_2=0}^{n_2}\Sigma_{i_3=0}^{n_3}P_{i_1,i_2,i_3}B_{i_1}^{n_1}(x)B_{i_2}^{n_2}(y)B_{i_3}^{n_3}(z), \quad (1)$$

where $P_{i_1,i_2,i_3}$ are the control points of the 3D mesh of M and $B_{i_1}^{n_1}(u)$ is the $i_1$'th Bézier basis function, of degree $n_1$.

Herein, we only discuss the necessary computation imposed by a trivariate-trivariate composition, while the cases of curve-trivariate and surface-trivariate are similar, yet obviously simpler.

Consider the trivariate-trivariate composition $\overline{M}=M(T)$, where deformation mapping M is as in Equation (1) and tile T is:

$$T(u,v,w)=\Sigma_{j_1=0}^{m_1}\Sigma_{j_2=0}^{m_2}\Sigma_{j_3=0}^{m_3}Q_{j_1,j_2,j_3}B_{j_1}^{m_1}(u)B_{j_2}^{m_2}(v)B_{j_3}^{m_3}(w). \quad (2)$$

One can map the control points, $Q_{j_1,j_2,j_3}$, of T through M as $M(Q_{j_1,j_2,j_3})$, yielding $$\overline{M}\approx\Sigma_{j_1=0}^{m_1}\Sigma_{j_2=0}^{m_2}\Sigma_{j_3=0}^{m_3}P_{i_1,i_2,i_3}B_{j_1}^{m_1}(q_{j_1,j_2,j_3}^x) B_{j_2}^{m_2}(q_{j_1,j_2,j_3}^y)B_{j_3}^{m_3}(q_{j_1,j_2,j_3}^z), \quad (3)$$

where $Q_{j_1,j_2,j_3}=(q_{j_1,j_2,j_3}^x, q_{j_1,j_2,j_3}^y, q_{j_1,j_2,j_3}^z)$ as is typically done with the FFD of input data where only the control points of curves and surfaces and the vertices of the polygons are mapped through M. However, Equation (3) is only an approximation of $\overline{M}=M(T)$. Further, continuity will not be preserved and the geometry will only loosely follow the micro-shape induced by T. Alternatively, a precise mapping of T through M (See FIG. 1) can be computed using function composition, methods for which are disclosed in DeRose, et al., 1993, Functional composition algorithms via blossoming, *ACM Trans. Graph.* 12, 2 and Elber, G., 1992, PhD thesis, University of Utah, Free form surface analysis using a hybrid of symbolic and numerical computation, which are herein incorporated by reference:

$$\overline{M} = M(T) \quad (4)$$

$$= M(t^x(u, v, w), t^y(u, v, w), t^z(u, v, w))$$

$$= \sum_{i_1=0}^{n_1}\sum_{i_2=0}^{n_2}\sum_{i_3=0}^{n_3} P_{i_1,i_2,i_3} B_{i_1}^{n_1}(t^x(u, v, w))B_{i_2}^{n_2}(t^y(u, v, w))B_{i_3}^{n_3}(t^z(u, v, w)),$$

where ($t^x$, $t^y$, $t^z$) are the coefficients of T. Equation (4) amounts to the computation of products of terms in the form of $B_{i_1}^{n_1}(t^x(u, v, w))$. If $B_{i_1}^{n_1}$ is a polynomial (Bézier) function and $Q_{j_1,j_2,j_3}=(q_{j_1,j_2,j_3}^x, q_{j_1,j_2,j_3}^y, q_{j_1,j_2,j_3}^z)$, then:

$$B_{i_1}^{n_1}(t^x(u, v, w)) = \binom{n_1}{i_1}t^x(u, v, w)^{i_1}(1-t^x(u, v, w))^{n_1-i_1} \quad (5)$$

$$= \binom{n_1}{i_1}\left(\sum_{j_1=0}^{m_1}\sum_{j_2=0}^{m_2}\sum_{j_3=0}^{m_3} q_{j_1,j_2,j_3}^x B_J^M(u, v, w)\right)^{i_1}$$

$$\left(1 - \sum_{j_1=0}^{m_1}\sum_{j_2=0}^{m_2}\sum_{j_3=0}^{m_3} q_{j_1,j_2,j_3}^x B_J^M(u, v, w)\right)^{n_1-i_1},$$

where $B_J^M(u, v, w)=B_{j_1}^{m_1}(u)B_{j_2}^{m_2}(v)B_{j_3}^{m_3}(w)$.

Algorithms to directly evaluate the product (and summation) of splines, in both Bézier and B-spline forms, are well known, and all the above formulation can be applied to either the Bézier or the B-spline representation, with one caution. If M is a B-spline trivariate, then tile T cannot, in general, cross knot lines in M. Because tensor product splines can represent finite (dis)continuities only along knots, a general crossing of a knot line of M by T is likely to introduce a irrepresentable by tensor product splines diagonal (dis)continuity into M(T). Hence, T must be divided along the knot lines of T. If T consists solely of univariates, these univariates could be divided at the knot lines of M, only to be re-merged into M(T). However, if T is a surface or a trivariate it must be divided along the knot lines into smaller, not necessarily rectangular surface/trivariates patches. Further, those new patches must be again divided into rectangular/cuboid patches. While a feasible process, it is unfortunately a far more difficult process that also affects the regularity of the tiles' representation, in the micro-structure as a whole. Hence, herein we limit ourselves to bivariate and trivariate tiles that cross no knot lines in M.

The continuity of $\overline{M}=M(T)$ is directly governed by the lowest continuity between the continuities of M and T, a result that stems directly from the chain rule of differentiation of composition functions. A function is considered regular if its Jacobian vanishes in no place. Again, and using the chain rule of differentiation $\overline{M}$ can be shown to be regular if both M and T are regular. This means that a mapping of a regular k-manifold, k=1,2,3 through a regular trivariate M will yield back a regular k-manifold, k=1,2,3, albeit of a higher degree. One may consider degree reduction approximation to M(T) to simplify the computation.

Having the ability to compute M(T) as well as the simpler cases of surface-trivariate (and polygon-trivariate) and curve-trivariate compositions, we consider periodic tiles in 3D that pave the domain of M ($c_x \times c_y \times c_z$) times (See also FIGS. 1A-D). A tile is considered $C^n$ periodic if the boundaries of the tile for $u_{min}$, $v_{min}$, $w_{min}$ match the boundaries of the same tile for $u_{max}$, $v_{max}$, $w_{max}$, with $C^n$ continuity, respectively. That is, $$\left.\frac{\partial^m t_a}{\partial p^m}\right|_{u_{min}} = \left.\frac{\partial^m t_a}{\partial p^m}\right|_{u_{max}}, m=0,\ldots,n, \quad (6)$$

in all axes a=x, y, z and in all permutations of parameters p $\in \{u, v, w\}$.

We also need to consider M's boundary end conditions. Consider the pavement of the domain M by tile T ($c_x \times c_y \times c_z$) times. A tile T can be $C^n$ periodic but tiles placed on the boundary of M must be closed along their boundary. That is, all tiles (i, j, 1) and (i, j, $c_z$), for all i $\in$ (1, ..., $c_x$), j $\in$ (1, ..., $c_y$) must all be closed in the $w_{min}$ and $w_{max}$ directions, respectively, and the same holds for the u and v min/max boundaries. While one can consider handling these boundary openings after the mapping through M, we propose a simpler remedy. Given a $C^n$ periodic tile T, process it by computing its Boolean set operations with the six planes u=$u_{min}$, u=$u_{max}$, v=$v_{min}$, v=$v_{max}$, w=$w_{min}$, w=$w_{max}$, and their combination thereof, considering face, edge and vertex neighborhoods, 26 neighbors in all. As an example, tile (1,1,1), that should be closed in $u_{min}$, $v_{min}$ and $w_{min}$, will be applied with Boolean set operations and sealed against planes u=$u_{min}$, v=$v_{min}$ and w=$w_{min}$. Then, and based on the tile's indices in M, the proper boundary or interior tile will be employed out of the 27 tiles we will have, in whole. While the output can include hundred of thousands if not millions of mapped tiles, by computing the boundary tiles a-priori, only 26 different, local to the tile, Boolean set operations are required.

Then, if M is a regular $C^n$ (or better) trivariate and T is a regular $C^n$ k-manifold periodic tile, a watertight $C^n$ k-manifold model can be formed, except possibly at the boundaries, as the intersection curves along the Boolean set operations are typically only $C^0$. In the next section, the power of this modeling constructor is fully revealed and demonstrated.

By a first aspect, there is provided a method for modeling a 3D object, comprising operating at least one hardware processor for: receiving a 3D volumetric model of the object, wherein the 3D volumetric model is embodied in a digital file; receiving a 3D model of a tile, wherein the 3D model of the tile is embodied in a digital file; paving multiple ones of the tile in the interior domain of the 3D volumetric model, to fill at least a portion of the inner volume of the domain of the 3D volumetric model; and providing a 3D filled model of the filled inner volume of the 3D volumetric model, wherein the 3D filled model is embodied in a digital file.

As used herein, a "volumetric model" refers to a model that comprises both the boundary of the object as well as the volume within that boundary. In some embodiments, the inside of the object is homogenous. In some embodiments, the inside of the object is heterogeneous. In some embodiments, the method of the invention is for modeling that heterogeneity. As used herein, a "boundary model" refers to a model that comprises only the boundary or outside surface of a 3D object. In some embodiments, receiving of the 3D volumetric model comprises receiving a 3D boundary model and converting the 3D boundary model into the 3D volumetric model. This can be done, for example, by dividing the interior volume of the boundary model to cuboids and fitting tensor product trivariate functions to the cuboid domains, or alternatively by using the constructive solid geometry (CSG) paradigm of geometric modeling and providing volumetric constructors for primitives and volumetric Boolean operators, as in Massarwi, et al., 2016, A b-spline based framework for volumetric object modeling, *Computer Aided Design* 78, 36-47, that is incorporated herein by reference. In some embodiments, the 3D boundary model is embodied in a digital file.

In some embodiments, the 3D object is a composite material. In some embodiments, the 3D object is a composite of more than one material. In some embodiments, the 3D object is made of more than one material. In some embodiments, the 3D object is made of functionally graded material. Composite materials are well known in the art and refer to materials made from two or more constituent materials with significantly different physical or chemical properties. Many construction materials are composites such as for non-limiting example, epoxies, fiber-reinforced composites (such as reinforced concrete) and biopolymers. In some embodiments, the 3D object's interior is a composite material. In some embodiments, the 3D object's interior is a composite. In some embodiments, the 3D object's interior is made of more than one material. In some embodiments, the 3D filled model comprises a digital representation of at least two materials. In some embodiments, the 3D filled model comprises a digital representation of a composite. In some embodiments, the 3D filled model comprises a digital representation of a functionally graded material. In some embodiments, the 3D filled model comprises a digital representation of fibers in composite.

In some embodiments, the interior of the 3D object comprises a microstructure. In some embodiments, the interior comprises a repeating microstructure. In some embodiments, the interior comprises more than one microstructure. In some embodiments, the interior comprises more than one repeating microstructure. It should be understood that "microstructure" as used herein does not refer to something on the micrometer scale, but rather refers to a smaller structure within a larger structure (the 3D object), and possibly even in further recursive levels. In some embodiments, the methods of the invention are for modeling microstructures into a 3D object. In some embodiments, the methods of the invention are for modeling porous geometry into a 3D object.

In some embodiments, the 3D volumetric model is a trivariate. In some embodiments, the 3D volumetric model is a combination of more than one trivariate. In some embodiments, the 3D volumetric model is a trimmed trivariate. In some embodiments, the 3D volumetric model is a combination of more than one trimmed trivariate. In some embodiments, the 3D volumetric model is a combination of at least one trivariate and at least one trimmed trivariate. In some embodiments, the 3D volumetric model is a free-form deformation (FFD). In some embodiments, the 3D volumetric model is an extended FFD. In some embodiments, the 3D volumetric model is a non-grid topology extended FFD. In some embodiments, the 3D volumetric model is a grid extended FFD.

In some embodiments, the method further comprises mathematical function composition of the multiple paved tiles with the 3D volumetric model. In some embodiments, the paving comprises mathematical function composition of the multiple tiles with said 3D volumetric model. In some embodiments, the method further comprises mathematical points and/or vertices mapping of the multiple paved tiles through the 3D volumetric model. In some embodiments, the functional composition comprises placing tiles within a 3D grid of the volume of space inside the 3D volumetric model and then deforming the tiles along the shape of the 3D volumetric model. In this way, each tile will be deformed to fit into a given space in the 3D volumetric model. In some embodiments, the tiles are not equally deformed. This method has the benefit of creating a continuous and/or smooth inside to the model. In some embodiments, after paving the shape of a tile varies across the 3D volumetric model. In some embodiments, the paving comprises changing the shape of the tile across the 3D volumetric model. In some embodiments, the paving comprises setting the shape of a tile to follow at least one physical constraint on the model. Non-limiting examples of physical constraints include physical stress limitation/optimization, heat transfer limitation/optimization, and shape optimization. In some embodiments, setting the shape of a tile to follow a physical constrains is achieved by performing an optimization and/or an analysis of that physical constraint on the model. In some embodiments, the optimization and/or analysis is selected from stress analysis, heat transfer analysis and shape optimization. Depending on the analysis selected a tile can be paved into a given model in more than one way.

In some embodiments, the 3D model of a tile comprises a 3D model of the microstructure to be repeated within the volume of the 3D object. In some embodiments, the tile models heterogenous material. In some embodiments, the tile models unisotropic material. In some embodiments, the tile models functionally graded materials. In some embodiments, the tile models heterogeneous, unisotropic or functionally graded materials. In some embodiments, the tile models a composite. In some embodiments, the tile models composite materials. In some embodiments, the tile models a composite of more than one material. In some embodiments, the tile models fibers in a composite.

In some embodiments, the tile comprises a univariate curve. In some embodiments, the tile comprises a bivariate surface. In some embodiments, the tile comprises a trivariate volume. In some embodiments, the tile comprises a curve and a surface. In some embodiments, the tile comprises a curve and a volume. In some embodiments, the tile comprises a surface and a volume. In some embodiments, the tile comprises a curve, a surface, and a volume. In some embodiments, the tile comprises a curve, a surface, a volume or a combination thereof. In some embodiments, the tile comprises a polyline. In some embodiments, the tile comprises a polygon. In some embodiments, the tile comprises a voxel. In some embodiments, the tile comprises a tetrahedron. In some embodiments, the tile comprises a univariate curve, a bivariate surface, a trivariate volume, a polyline, a polygon, a tetrahedron, or a combination thereof. In some embodiments, the tile does not comprise surface-trivariate compositions. In some embodiments, the tile does not comprise 2-manifold micro-structures. In some embodiments, the method further comprises tessellation of the tile into a polygon.

In some embodiments, the tile comprises trimmed geometry. In some embodiments, the tile has trimmed geometry. In some embodiments, the tile comprises trimmed geometry and non-trimmed geometry. In some embodiments, the tile comprises a bivariate trimmed surface. In some embodiments, the tile comprises a trivariate trimmed volume. In some embodiments, the tile comprises a curve and a trimmed surface. In some embodiments, the tile comprises a curve and a trimmed volume. In some embodiments, the tile comprises a trimmed surface and a volume. In some embodiments, the tile comprises a surface and a trimmed volume. In some embodiments, the tile comprises a trimmed surface and a trimmed volume. In some embodiments, the tile comprises a curve, a surface, a trimmed surface, a volume, a trimmed volume or a combination thereof. In some embodiments, the tile comprises a univariate curve, a bivariate surface, a bivariate trimmed surface, a trivariate volume, a trimmed trivariate volume, a polyline, a polygon, a tetrahedron, or a combination thereof.

In some embodiments, the tile is a color tile. In some embodiments, the tile comprises color. In some embodiments, the tile models color. In some embodiments, the tile is a textured tile. In some embodiments, the tile comprises texture. In some embodiments, the tile models texture. In some embodiments, the tile comprises more than one material. In some embodiments, the tile models a material. In some embodiments, the tile models at least one of color, texture, a material and a combination thereof. In some embodiments, the tile comprises at least one of color, texture, a material and a combination thereof. Generally, a tile may comprise any physical attribute to be modeled into the 3D object. In some embodiments, the shape of the tile is constant. In some embodiments, the shape of the tile is variable. In some embodiments, the tile is approximated after the composition. In some embodiments, the methods of the invention further comprise approximating the tile after the composition. In some embodiments, the approximating is by degree reduction. Methods of degree reduction of Bezier or splines geometry are known in the art and those methods for degree reduction may be applied to the composed result.

In some embodiments, the tile is a periodic tile. In some embodiments, a periodic tile comprises a minimum and maximum of one dimension that are equal. A tile is considered $C^n$ periodic if the boundaries of the tile for $u_{min}$, $v_{min}$, $w_{min}$ match the boundaries of the same tile for $u_{max}$, $v_{max}$, $w_{max}$, with $C^n$ continuity, respectively. In this way when two tiles are placed side-by-side on that dimension the minimum of one tile is equal to the maximum of the other tile and so that dimension is closed between the two tiles. In some embodiments, the paving is periodic paving. In some embodiments, periodic paving comprises direct contact between adjacent tiles. In some embodiments, the tile is periodic in one dimension, two dimensions or three dimensions. In some embodiments, the tile is periodic in three dimensions.

It will be understood by one skilled in the art, that even as tiles are placed within the interior space of the 3D volumetric model some of the tiles will be on the boundary of the model and thus will not contact another tile along the boundary. In some embodiments, a tile along the boundary is closed along that boundary. In some embodiments, the method further comprises closing a tile placed upon a boundary of the 3D volumetric model along that boundary. Consider the pavement of the domain M by tile T ($c_x \times c_y \times c_z$) times. A tile T can be $C^n$ periodic but tiles placed on the boundary of M must be closed along their boundary. That is, all tiles (i, j, 1) and (i, j, $c_z$), for all $i \in (1, \ldots, c_x)$, $j \in (1, \ldots, c_y)$ must all be closed in the $w_{min}$ and $w_{max}$ directions, respectively, and the same holds for the u and v min/max boundaries. In some embodiments, all boundaries are closed. In some embodiments, the closing comprises performing Boolean set operations. In some embodiments, the closing is performed before the paving. In some embodiments, the closing is performed after the tile is paved.

In some embodiments, the resulting 3D filled model is watertight. In some embodiments, the modeling comprises producing a watertight model. In some embodiments, using periodic tiles and closing all boundaries produces a watertight model. In some embodiments, the paving comprises producing building a smooth 3D geometry without discontinuity. In some embodiments, the methods of the invention produce a 3D filled model without discontinuity. In some embodiments, the methods of the invention produce a 3D filled model that can be constructed with additive manufacture. In some embodiments, the additive manufacture is 3D printing.

In some embodiments, the paving is of multiple ones of the tile. In some embodiments, the paving is of multiple copies of the tile. In some embodiments, the paving is of a set of tiles. The phrases, "multiple ones of the tile", "multiple copies of the tile" and "a set of tiles" are all used synonymously and refer to the paving of more than one tile. In some embodiments, the paving of multiple ones of tiles comprises repeated insertion of a tile at least one time along an x-axis, at least one time along a y-axis, and at least one time along a z-axis of a 3D grid within a domain of the 3D volumetric model. In some embodiments, the 3D filled model is produced by selecting the number of copies of the tile to be paved in each dimension. Thus, the input for paving of the tile comes in the form of (x, y, z) where each represents the number of times the tile is paved in each dimension. Increasing the number of times the tiled in paved increases the resolution in that dimension.

In some embodiments, paving of the tile forms a regular tiling of 3D space. In some embodiments, paving of the tile forms a semiregular tiling of 3D space. In some embodiments, paving of the tile forms a general tiling of 3D space. In some embodiments, paving of the tile forms a regular, semi regular or general tiling of 3D space.

In some embodiments, the paving does not comprise crossing a knot line in the 3D tile. In some embodiments, the paving does not comprise crossing a knot line in the 3D volumetric model. In some embodiments, the paving comprises crossing a knot line in the 3D tile. In some embodiments, the paving comprises crossing a knot line in the 3D volumetric model. In some embodiments, crossing a knot line comprises subdividing a tile at the crossed knot line. In some embodiments, the paving comprises crossing a knot line and subdividing a tile at the crossed knot line.

In some embodiments, the tile is produced by one of the methods of the invention. In some embodiments, the methods of the invention are preformed recursively. In some embodiments, an object is modeled using a method of the invention and that object is used as a tile for a second performance of the method of the invention. In some embodiments, the methods of the invention are preformed recursively at least 1, 2, 3, 4, 5, 6, 7, 8, 9, 10 times. Each possibility represents a separate embodiment of the invention. In some embodiments, degree reduction approximation is applied to the composed result with M, to simplify the recursive computation.

In some embodiments, the method of the invention further comprises transmitting the 3D filled model to a control unit of a manufacturing apparatus. In some embodiments, the method further comprises producing the 3D object from the 3D filled model. In some embodiments, the method of the invention further comprises: (a) transmitting the 3D filled model to a control unit of a manufacturing apparatus, and (b) producing the 3D object from the 3D filled model. In some embodiments, the manufacturing apparatus is for additive manufacture. Additive manufacture is well known in the art and includes for example 3D printing. In some embodiments, the manufacturing apparatus is for composite manufacturing. In some embodiments, the manufacturing apparatus is selected from the group consisting of: an apparatus for additive manufacturing, and an apparatus for composite manufacturing.

By another aspect, there is provided a computer program product for modeling a 3D object, comprising a non-transitory computer-readable storage medium having program code embodied thereon, the program code executable by at least one hardware processor to: receive a 3D volumetric model of the object, wherein the 3D volumetric model is embodied in a digital file; receive a 3D model of a tile, wherein the 3D model of a tile is embodied in a digital file; pave multiple ones of the tile in the interior domain of the 3D volumetric model, to fill at least a portion of the inner volume of the domain of the 3D volumetric model; and provide a 3D filled model of the filled inner volume of the 3D volumetric model, wherein the 3D filled model is embodied in a digital file.

In some embodiments, the program code is executable by at least one hardware processor to perform any of the methods of the invention.

By another aspect, there is provided a system for manufacturing a 3D object, comprising: a hardware processor, a storage medium comprising a computer program product of the invention, and a manufacturing apparatus.

In some embodiments, the manufacturing apparatus is capable of, or operable to, manufacture a 3D object from the 3D filled model embodied in a digital file. In some embodiments, the manufacturing apparatus is configured to manufacture a 3D object from the 3D filled model embodied in a digital file. In some embodiments, the manufacturing apparatus is an additive manufacturing apparatus, such as a 3D printer that is configured to additively apply one or more materials, such as polymers and/or metals, in order to manufacture the 3D object. In some embodiments, the manufacturing apparatus is a composite manufacturing apparatus, such as an apparatus for automated fiber placement (AFP), automated tape lay up (ATL), pultrusion, pulforming, braiding, diaphragm forming, molding (e.g., resin transfer molding, injection molding, compression molding), autoclave curing, and/or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the term "about" when combined with a value refers to plus and minus 10% of the reference value. For example, a length of about 1000 nanometers (nm) refers to a length of 1000 nm+−100 nm.

It is noted that as used herein and in the appended claims, the singular forms "a," "an," and "the" include plural referents unless the context clearly dictates otherwise. Thus, for example, reference to "a polynucleotide" includes a plurality of such polynucleotides and reference to "the polypeptide" includes reference to one or more polypeptides and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

Various embodiments and aspects of the present invention as delineated hereinabove and as claimed in the claims section below find experimental support in the following examples.

Examples and Results

Fabrication of Delicate Geometry

Figure 2A:
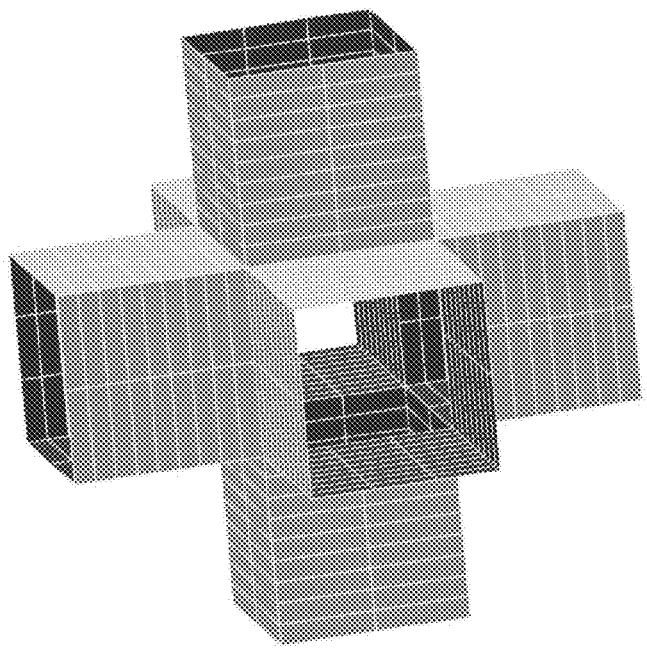
FIGS. 2A-2D: (2A) A tile formed of six bilinear B-spline surfaces. (2B-2D) Smooth and precise surface-trivariate compositions (2B) arising from the tile paving the domain of a trivariate in the shape of a duck, (2C) wherein the tile is converted to polygons and vertices are mapped through the trivariate, resulting in $C^1$ discontinuities (note the belly area), and (2D) whereing boundary sealling via Boolean set operations creates a watertight model. The interiors of the resulting surfaces when exposed are in magenta.
Figure 2B:
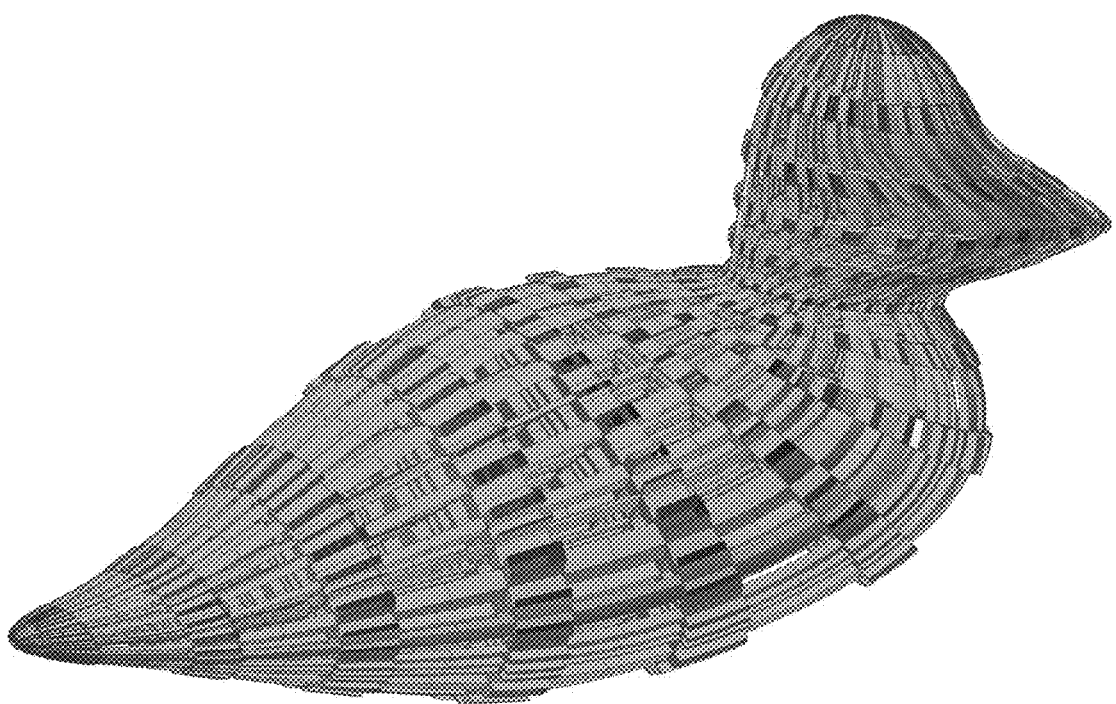
Figure 2C:
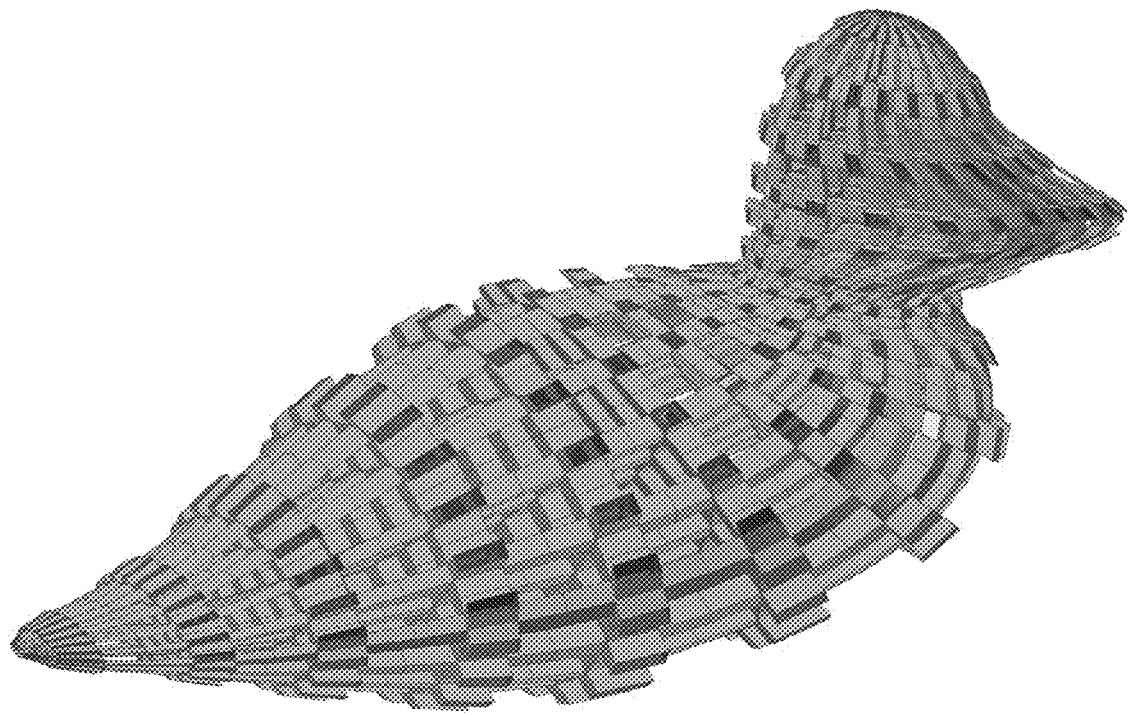

A modeling constructor based on trivariate functions can be quite powerful. It enables the fabrication of delicate geometry that is very difficult to construct in alternative ways. In FIG. 2, the domain of a trivariate duck is paved with piecewise linear B-spline surfaces' tiles, only to be using precise surface-trivariate composition computation. Six bilinear B-spline surfaces define this hollowed tile, shown in FIG. 2A. The result of the composition is shown in FIG. 2B whereas FIG. 2C presents a similar result when the surfaces of the tile are first converted to polygons while only the vertices of the polygons are mapped through M. Note the silhouettes near the belly area, in FIG. 2C, that are clearly $C^1$ discontinuous where they should have been smooth, at common boundaries between two different tiles.

Figure 2D:
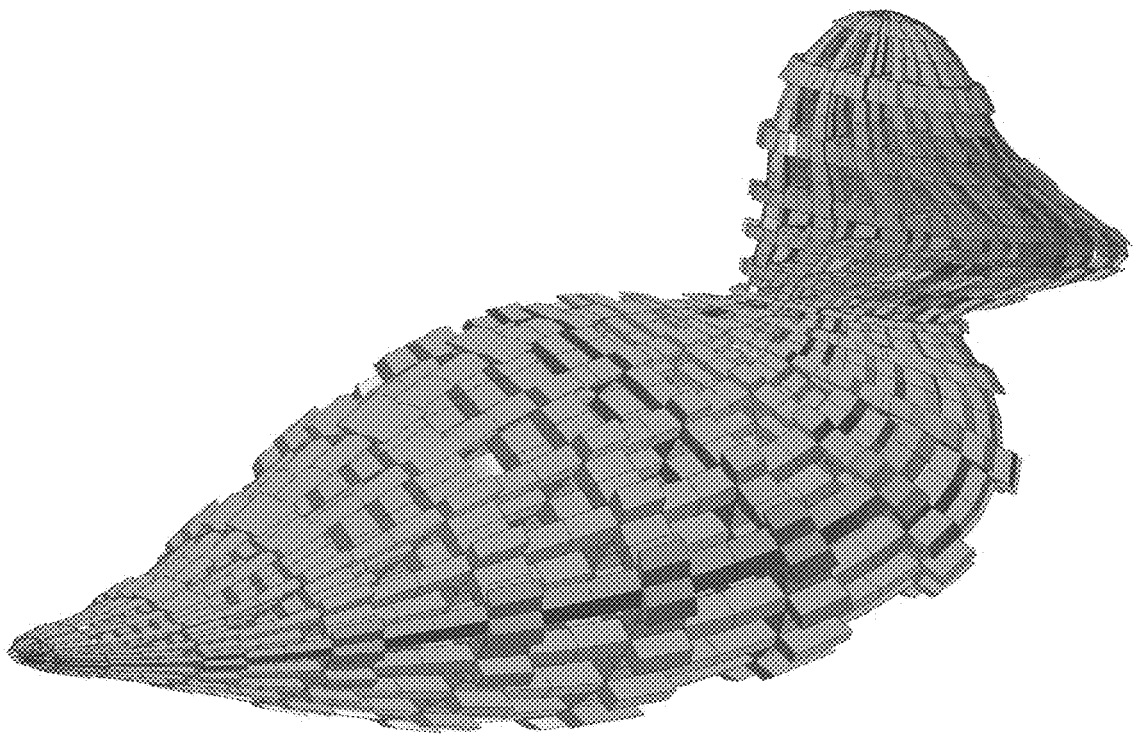

We seek viable models which means they should be watertight. If each tile is watertight and closed, the result will be watertight but consisting of numerous disjoint parts. If the tiles are periodic (and possibly smoothly periodic) between $(x_{min}, y_{min}, z_{min})$ and $(x_{max}, y_{max}, z_{max})$, the interior will be connected and hence sealed and watertight. However, we still need to close boundary openings along the boundary of T. This closure is simple to achieve as explained in Example 1—every tile that is a boundary tile in some direction, in the domain of the trivariate, will be sealed with the plane of that boundary, possibly using a Boolean set operation. FIG. 2D shows a watertight porous model that resulted from applying this boundary sealing operation to the model in FIG. 2C. As stated in the previous section, 26 such Boolean operations will be need.

Figure 3A:
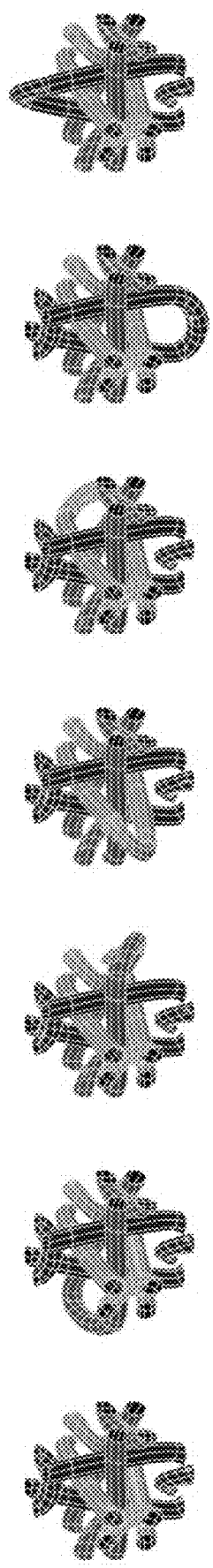
FIGS. 3A-3C. (3A) Tiles for creating a watertight, sealed model. The tiles in order are the interior tile, the $u_{min}$, $u_{max}$, $v_{min}$, $v_{max}$, $w_{min}$, and $w_{max}$ tiles. (3B-3C) Views of a (3×3×3) tiling, using these linked Borromean rings' tiles.
Figure 3B:
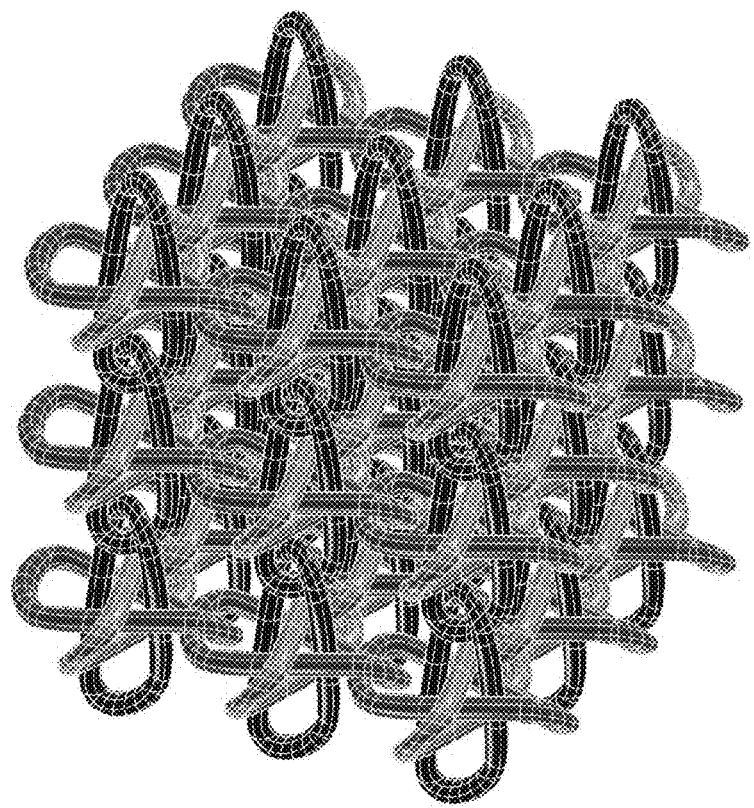
Figure 3C:
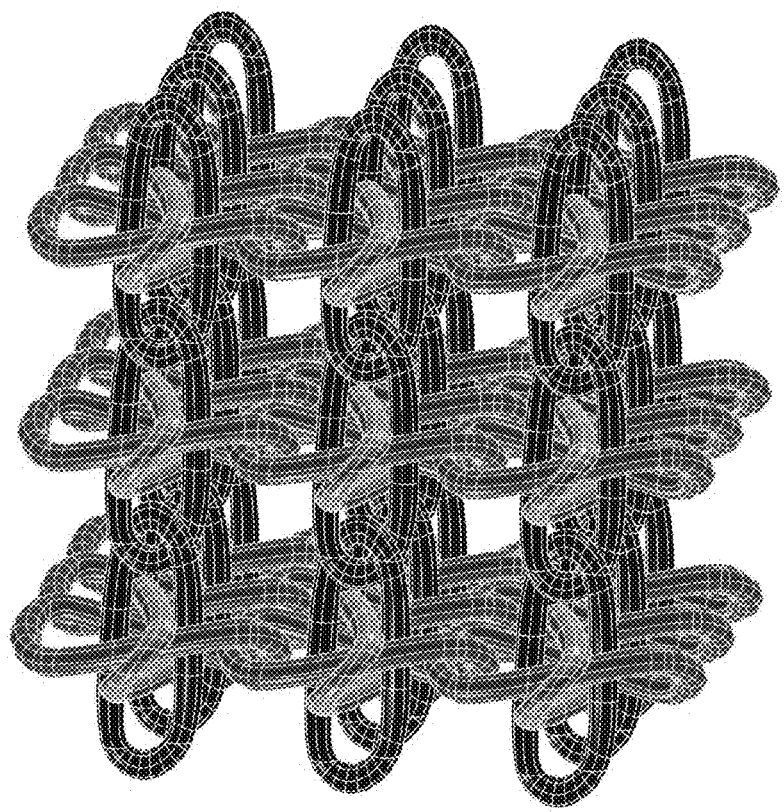
Figure 4A:
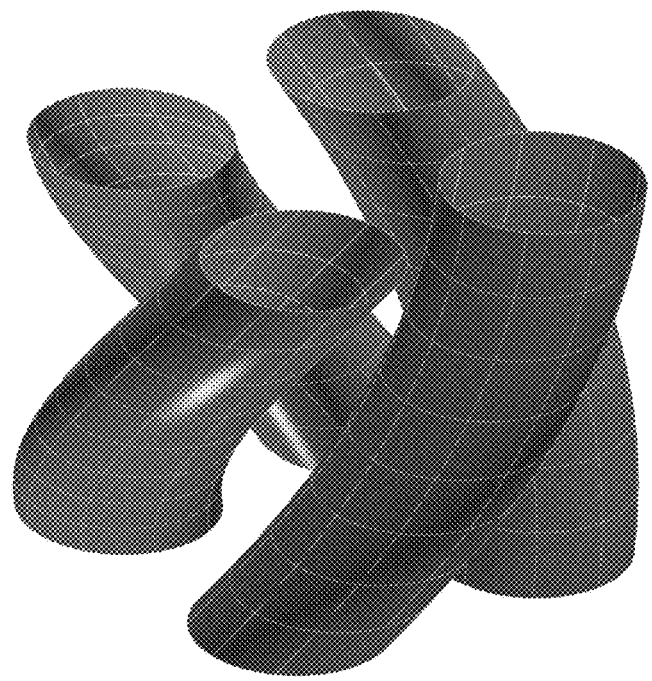
FIGS. 4A-4H. (4A) An image of a tile consisting of four B-spline helical-looking surfaces. (4B) A B-spline trivariate of degrees (3×3×3) and lengths (4×4×50) in the shape of a knot. (4C-4H) Trivariate compositions with the tile (4C-4D) paved (1×1×47) times in the domain (4D provides an alternative angle), and (4E-4H) paved with increasingly higher resolution (>47). In each composition one tile is highlighted in cyan.
Figure 4B:
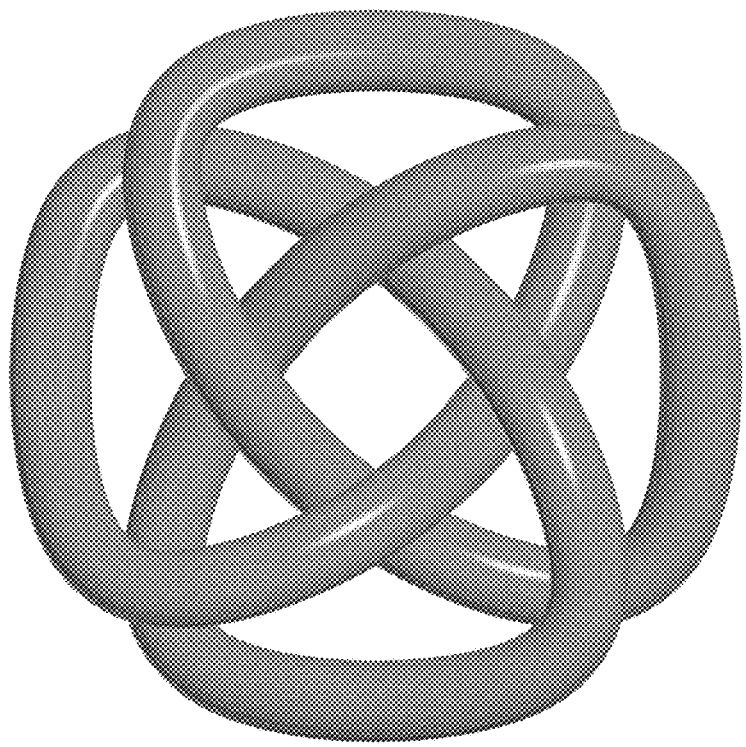
Figure 4C:
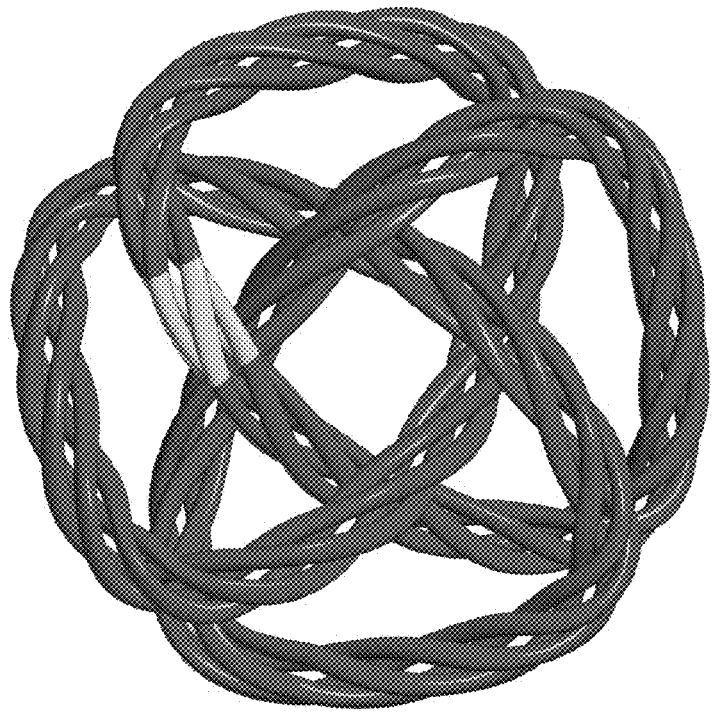
Figure 4D:
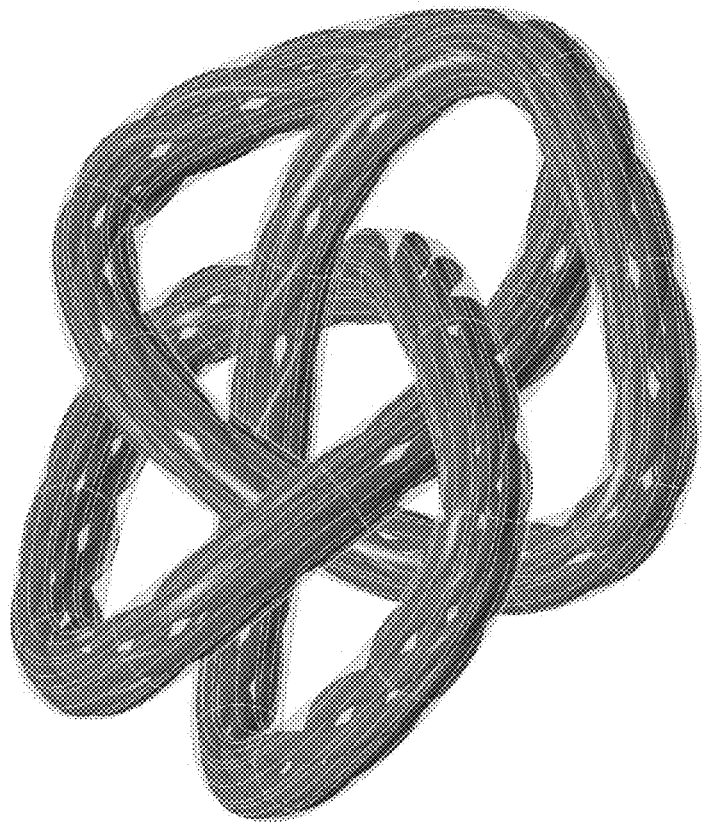
Figure 4E:
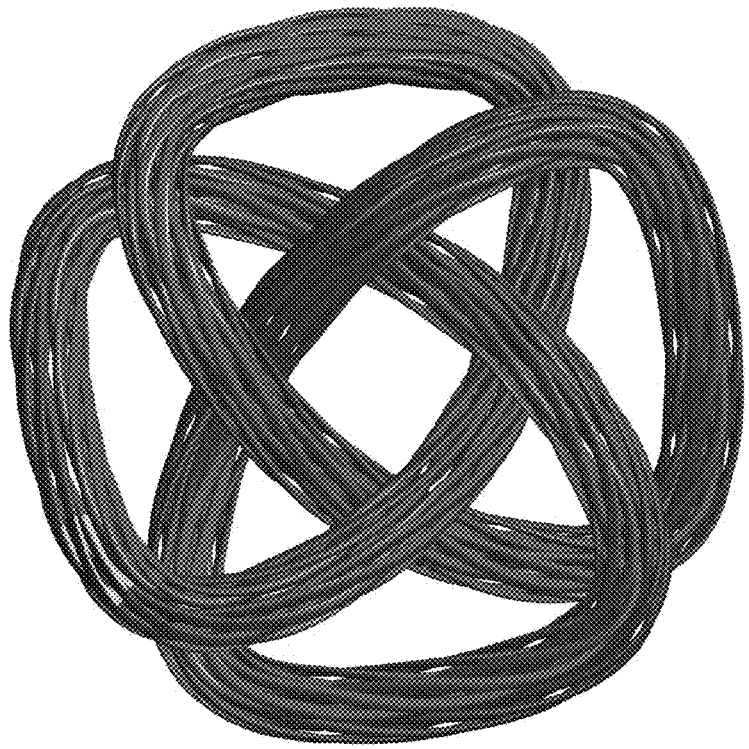
Figure 4F:
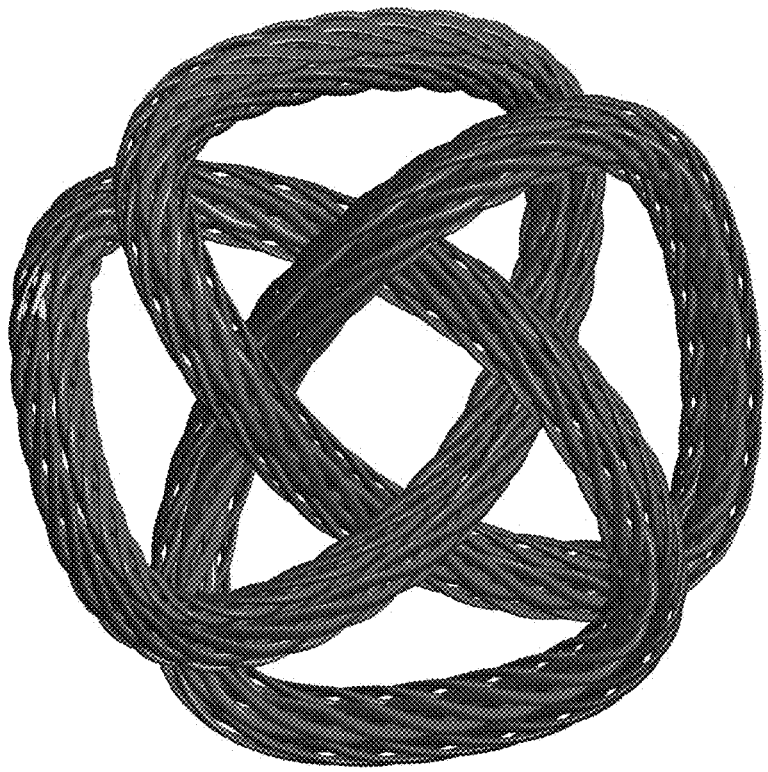
Figure 4G:
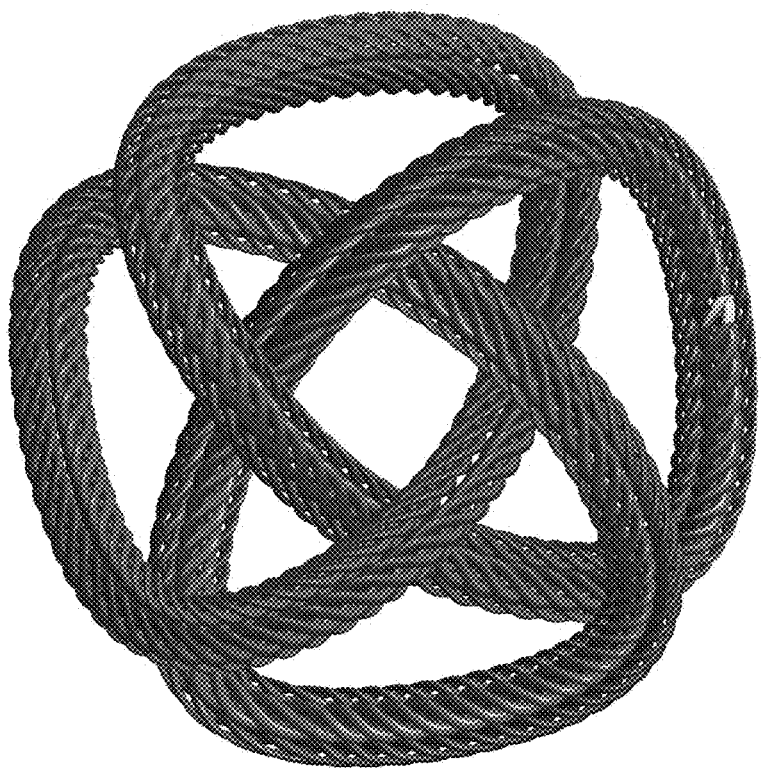
Figure 4H:
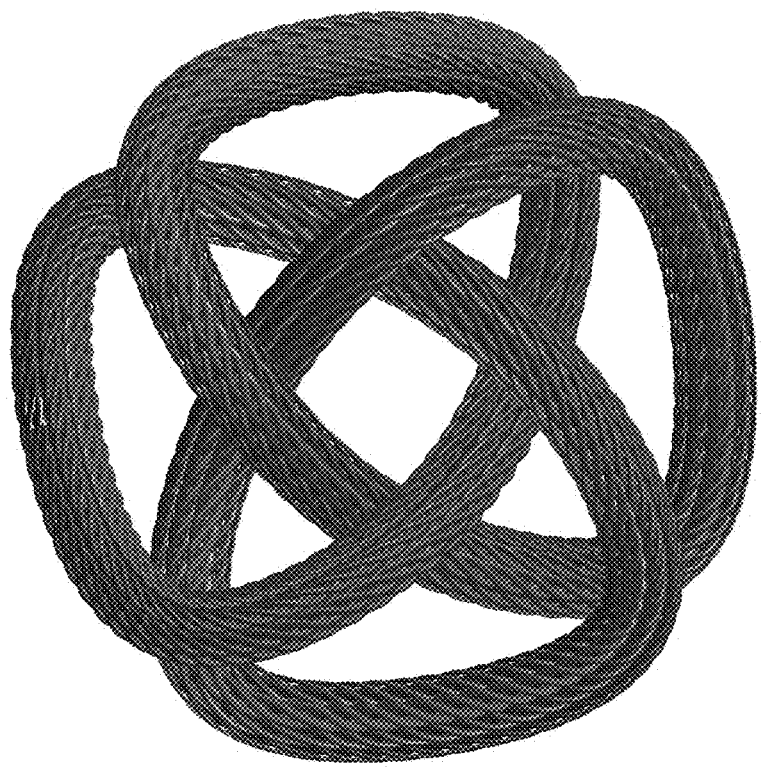

Alternatively, one can provide a-priori sealed tiles for the proper boundary. 26 such sealed tiles could be provided for all possible neighboring boundaries. FIG. 3 shows a tile consisting of three Borromean rings, tailored so they can also be linked to their neighbors. In FIG. 3A, the interior as well as the primary $u_{min}$, $u_{max}$, $v_{min}$, $v_{max}$, $w_{min}$, $w_{max}$ boundary tiles are shown, left to right. FIGS. 3B and 3C shows two views of a (3×3×3) tiling using these tiles, as a full watertight and smooth model, using the interior and six boundary tiles shown in FIG. 3A.

In FIG. 4, we pave 3D twisted tubes in a domain of a trivariate in the shape of a knot. The knot surface was created as a regular sweep of a circular cross section along a 3D knot curve. Then, volumetric Boolean sum was used to convert the sweep surface to the trivariate that is shown in FIG. 4B. The tile in FIG. 4A consists of four bicubic helical B-spline surfaces, constructed using algebraic sum between a quarter of a helical curve and a circle. In this example, we pave the tiles mostly in one direction—along the axis of the knot trivariate. The tile (smoothly) shifts between the four boundary openings, bottom to top, creating the twisting effect, in the $C^1$ continuous final result shown in FIGS. 4C and 4D. FIGS. 4E to 4H shows the same trivariate paved using increasingly higher resolutions, in all three axes.

Figure 5A:
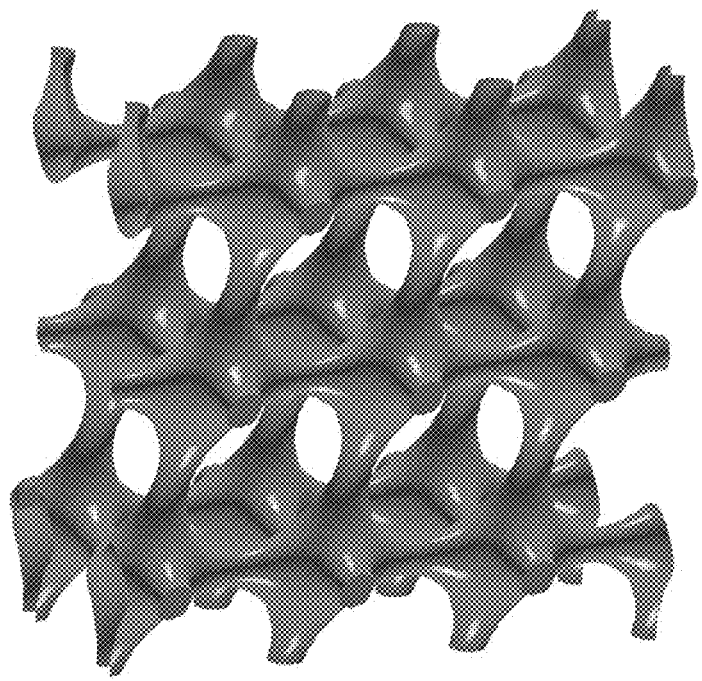
FIGS. 5A-5C. (5A) An image of a fairly complex polygonal periodic tile consisting of around 20 k polygons. (5B-5C) Trivariate compositions in which the tile is paves into a torus trivariate at a (5B) lower and (5C) higher resolution.
Figure 5B:
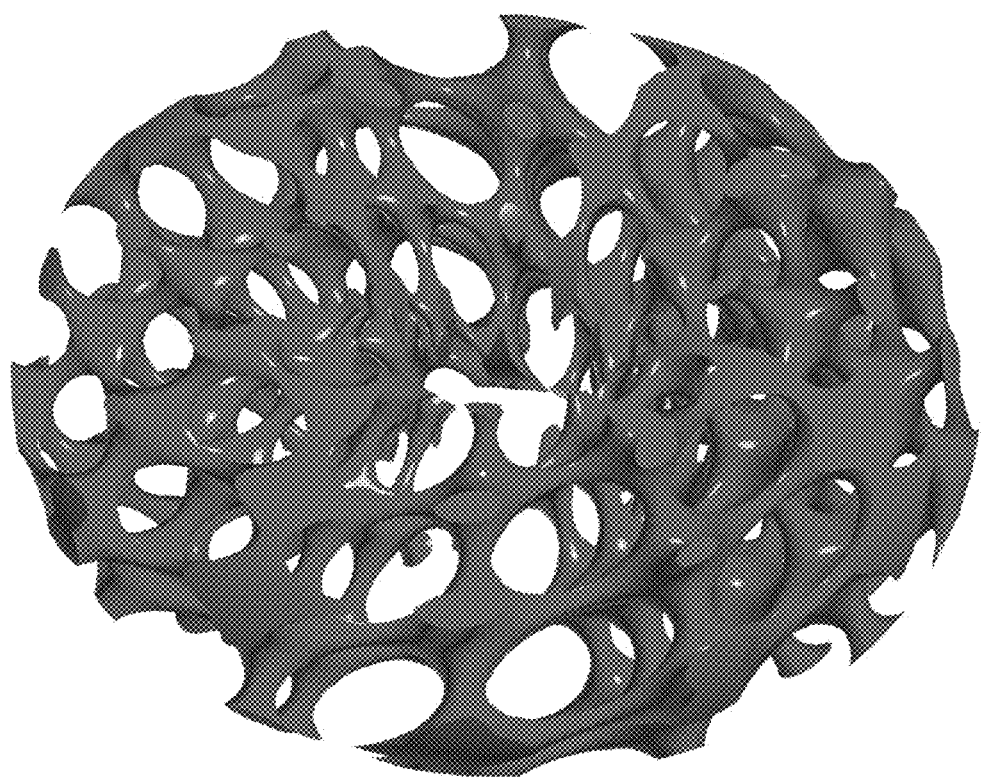
Figure 5C:
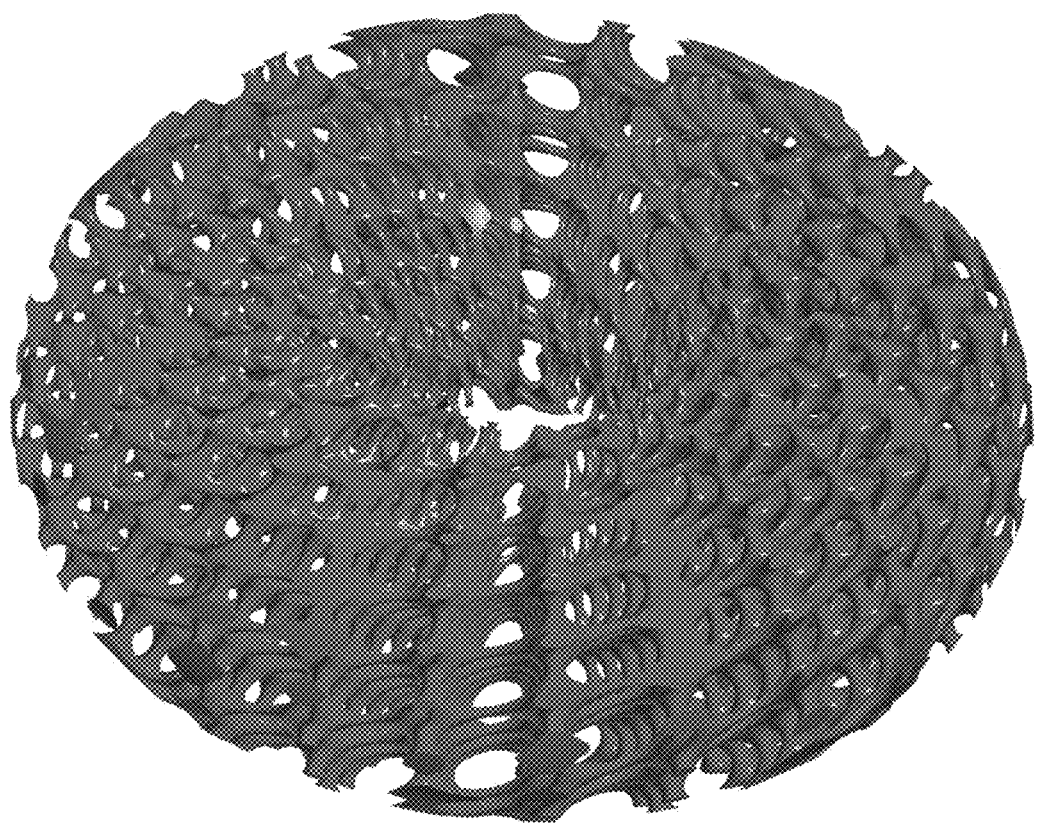

The complexity of the final model depends on the resolution of the pavements but also on the complexity of the individual tile. FIG. 5 shows an example where a fairly complex tile is exploited. The polygonal tile, in FIG. 5A, is paving the domain of a torus trivariate in FIG. 5B and FIG. 5C, using two different pavement's resolutions.

Recursive Application

Figure 6A:
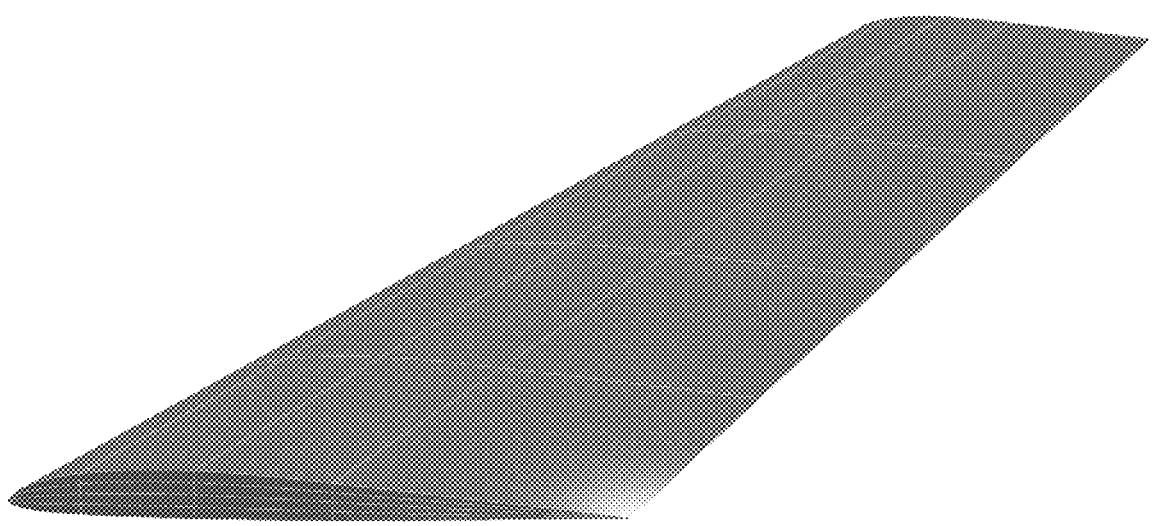
FIGS. 6A-6H. A recursive application of the composition operator. (6A) A trivariate model of a wing. (6B) A trivariate model of a vertical support pillar. (6C) Image of the wing trivariate-trivariate composed (8×4×1) times with the vertical support trivariate pillar. Tiling in the domain of the wing is shown. (6D) Result of the composition after deformation into the model of the wing. (6E) Zoomed in view of one trivariate pillar in 6D. (6F) A polygonal surface tile for paving into the trivariate pillar in a second recursive level. (6G) Image of the pillar trivariate domain composed (4×4×8) times with the tile. (6H) Result of the composition after deformation into the model of the pillar. In the composition one tile is highlighted in cyan.
Figure 6B:
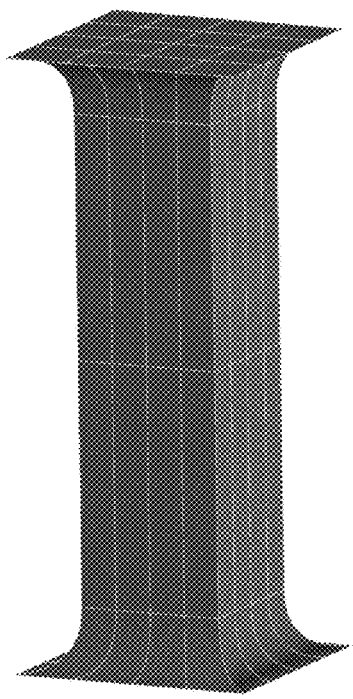
Figure 6C:
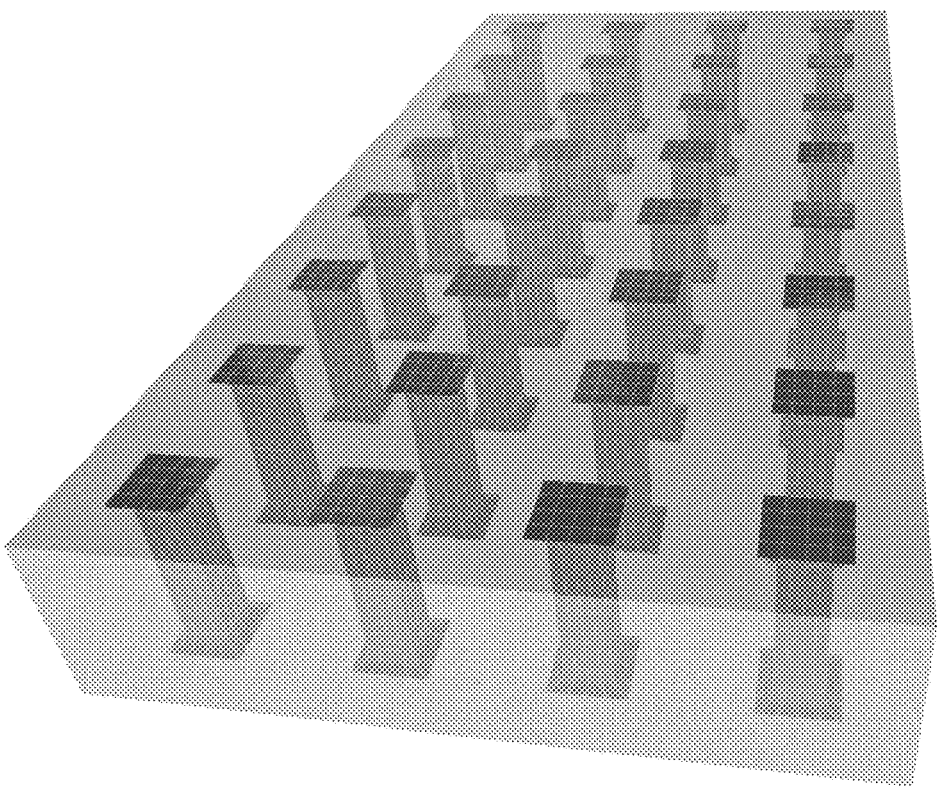
Figure 6D:
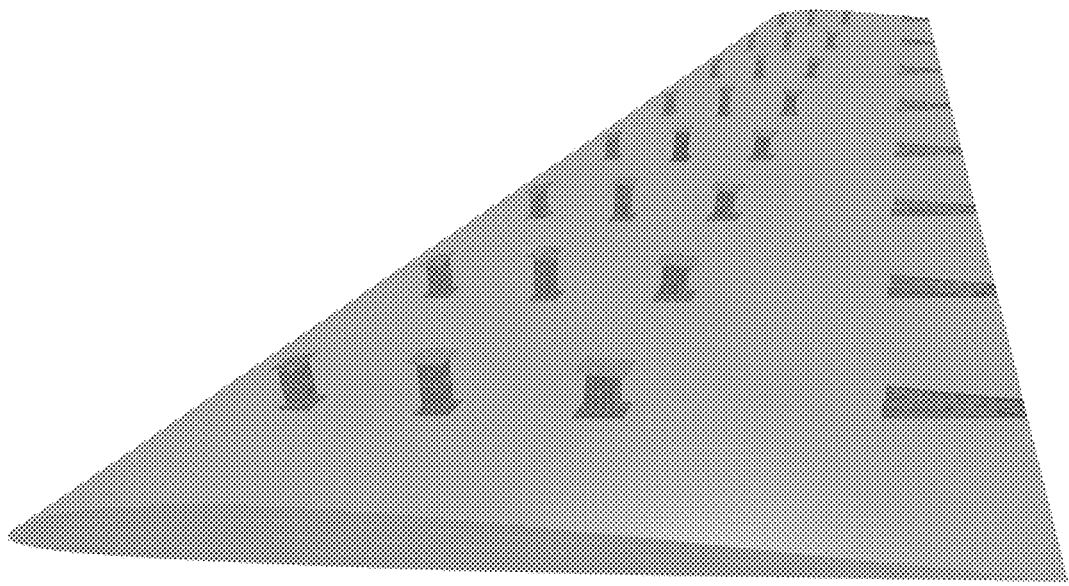
Figure 6E:
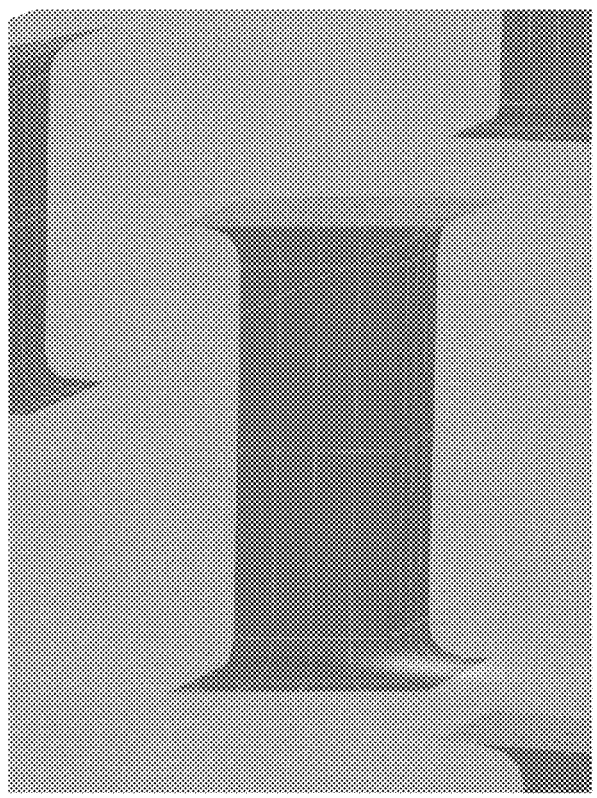
Figure 6F:
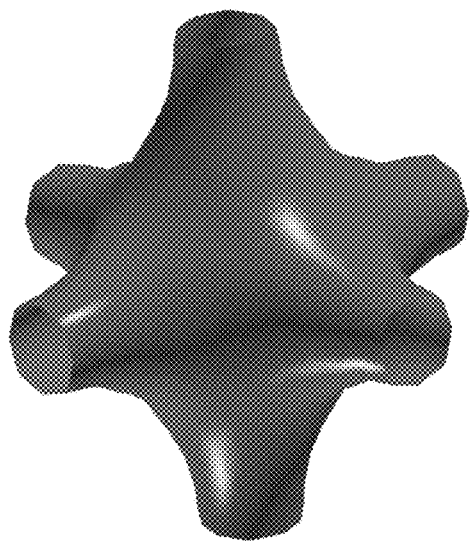
Figure 6G:
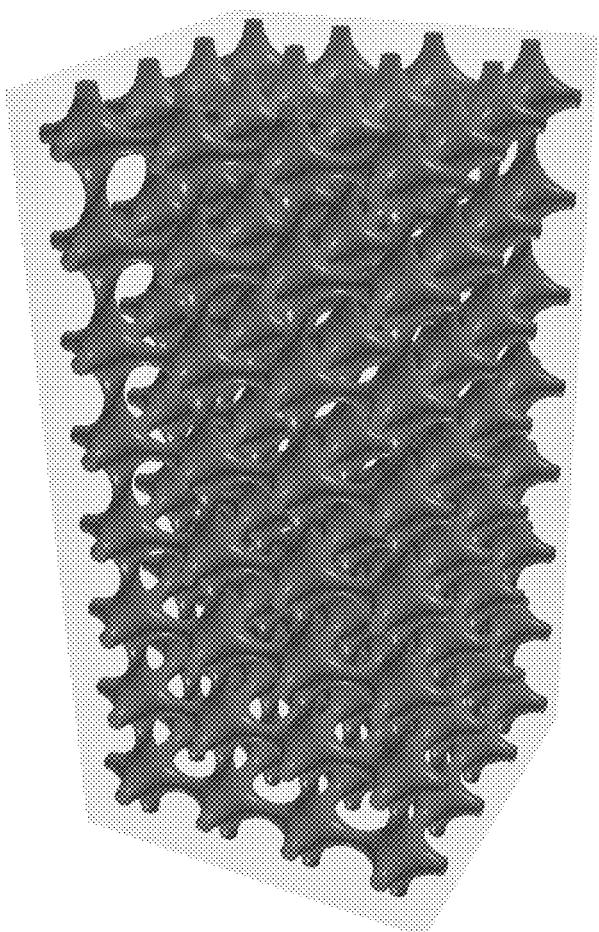
Figure 6H:
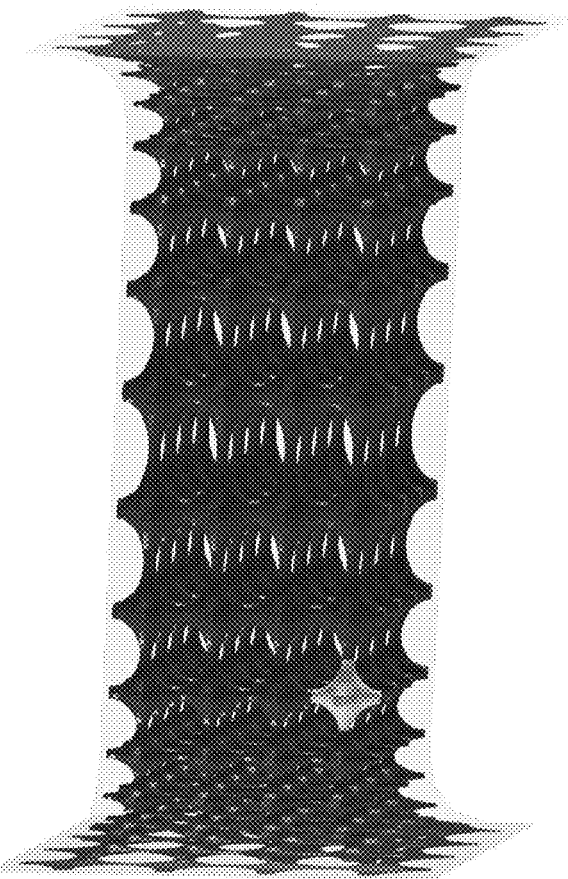
Figure 7A:
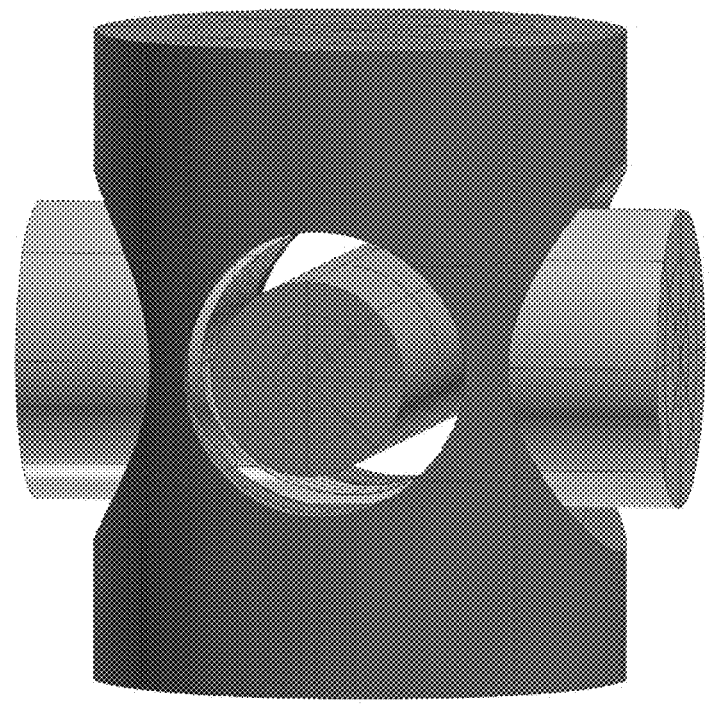
FIGS. 7A-7D. (7A) An image of a tile consisting of concentric trimmed through-cylinder surfaces. (7B) A trivariate model that will be composes of the tile (4×4×2) times. (7C-7D) Results of the composition from two different angles.
Figure 7B:
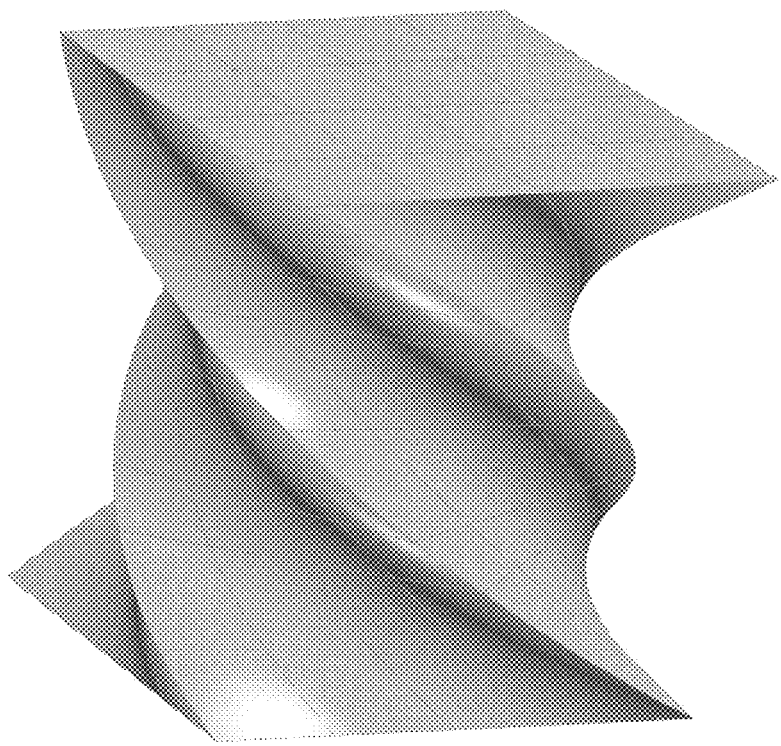
Figure 7C:
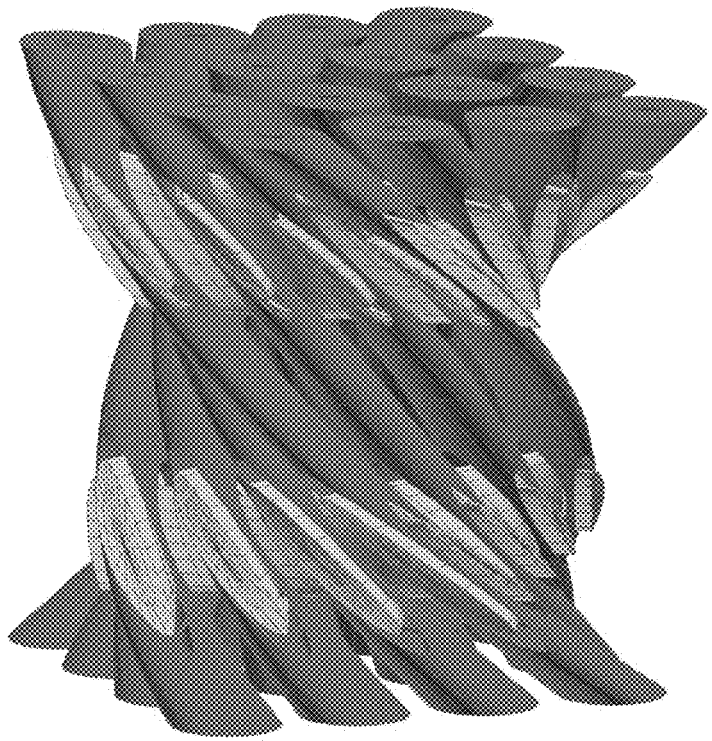
Figure 7D:
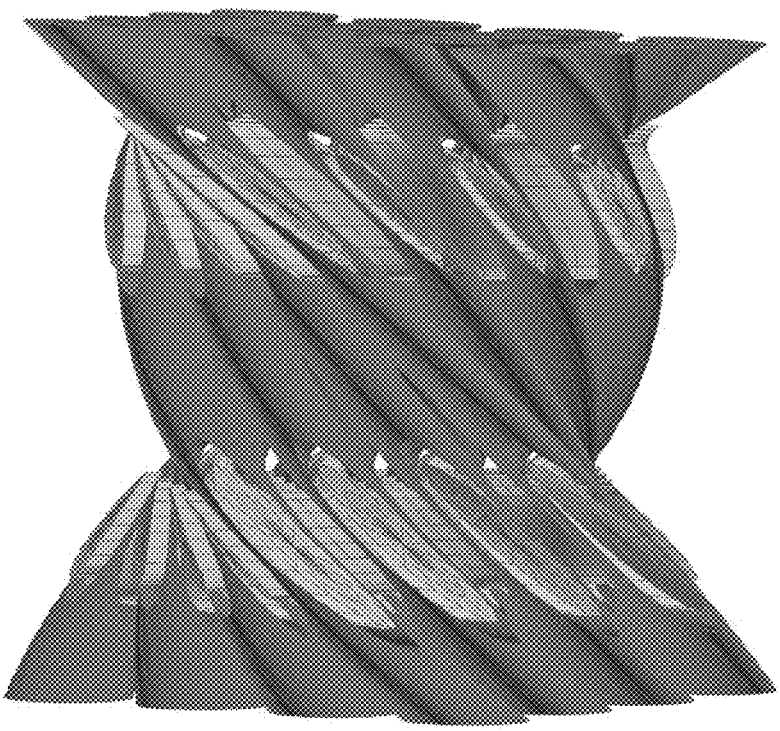

Because of the capability to conduct trivariate-trivariate composition, a closure is formed. A recursive application of the composition operator may be performed, and FIG. 6 demonstrates this ability. The wing model, in FIG. 6A, is constructed as a trivariate ruled volume. The supporting pillar structure, in FIG. 6B, is another trivariate volume that is constructed by lofting along a set of square surfaces of different sizes. By composing the support pillar trivariate tile into the wing domain (8×4×1) times (wing's domain is shown in FIG. 6C), 32 deformed pillars, shown in FIG. 6D, result. Note the 32 composed pillars are all differently shaped trivariates. In FIG. 6E, a zoom-in on one of these pillars is shown, only to recursively compose the polygonal surface tile, in FIG. 6F, in the pillar trivariate (8×4×4) times (pillar's domain is shown in FIG. 6G). The final, two-levels composition, result is shown in FIG. 6H, with one tile highlighted in cyan.

Trimmed Geometry

This surface-trivariate (and trivariate-trivariate) approach can also serve to handle trimmed geometry. Herein, the tensor product geometry undergoes composition whereas the trimming information is simply propagated along, as the domain(s) of the surface(s) (or trivariate(s)) in the tile is (are) not affected. FIGS. 7A-D show one example where three concentric trimmed through-cylinder B-spline surfaces are serving together as a tile that is composed (4×4×2) times in the mapping trivariate.

Composite Material Modeling

Figure 8A:
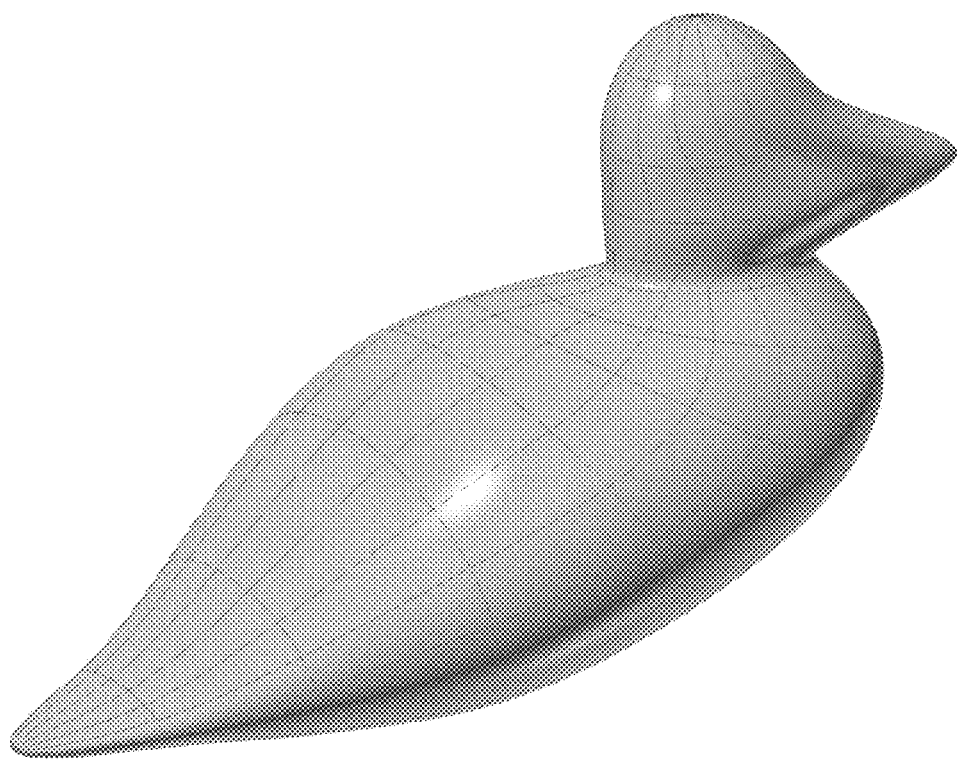
FIG. 8A-8F. Another two level recursive composition. (8A) Image of a duck surface. (8B) A periodic strip to be composed into the duck surface. (8C) Result of the strip being composed into the duck surface. (8D) An image of the duck surface strip made into a volume, by offsetting the strip surface and ruling a volume between the strip and its offset. (8E) Result of a recursive composition, wherein the trivariate strip is made transparent (to enable the visibility of its interior) and then composed with a stitches-like tile as a second composition. (8F) A zoom-in of 8E (with one tile enlarged, boxed), modeling a composite strip with detailed stitched fibers.
Figure 8B:
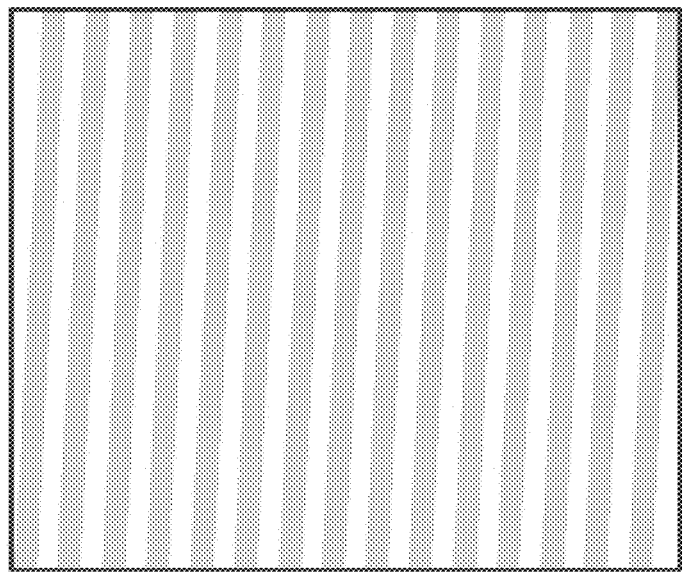
Figure 8C:
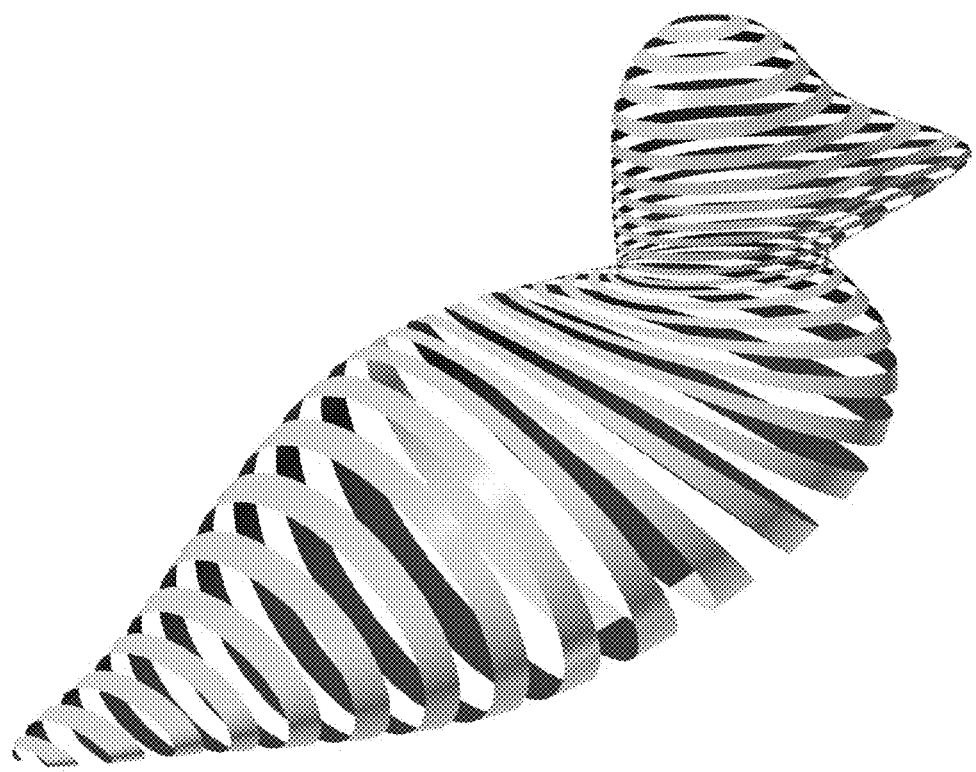
Figure 8D:
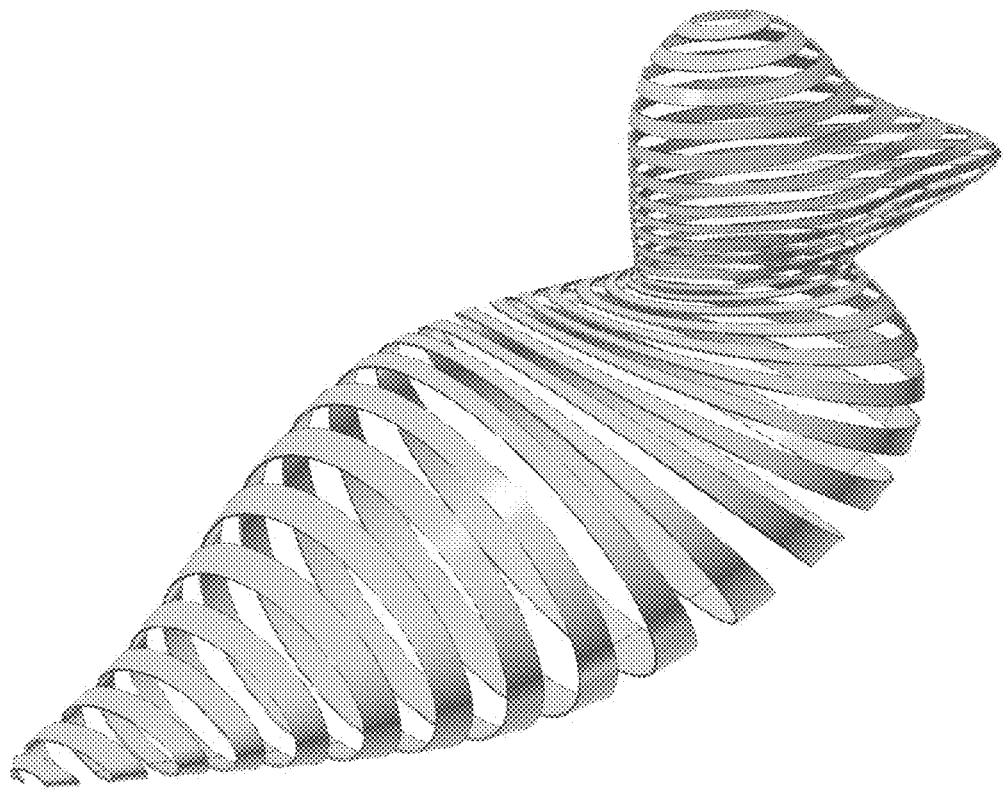
Figure 8E:
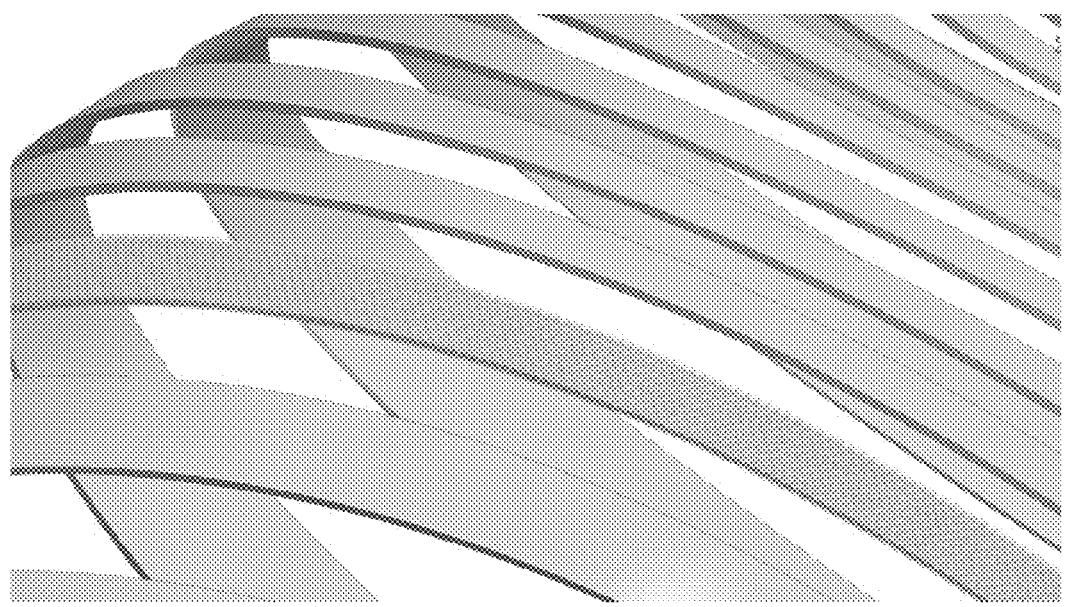
Figure 8F:
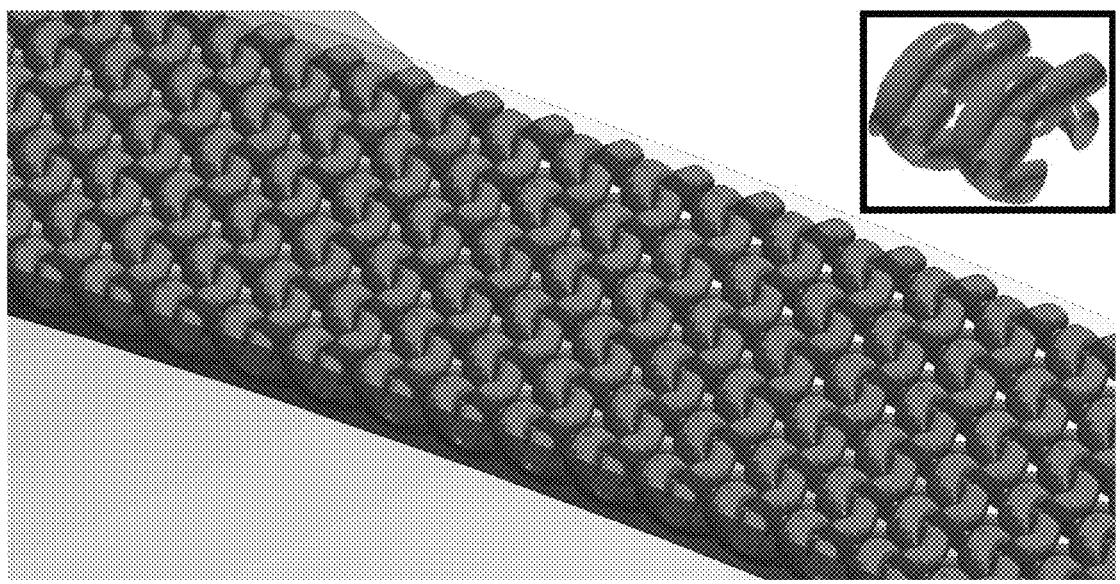

We now present another example that exploits surface-surface and surface-trivariate compositions, in two composition levels, toward the precise modeling of composite materials. The domain of the B-spline duck surface shown in FIG. 8A is tiled in FIG. 8B with parallel strip surfaces that are composed with the duck surface to yield FIG. 8C. The strip surface in FIG. 8C is then offset a bit to yield some real thickness and a trivariate strip is formed as a ruled volume between the original strip and its offset, and is shown in FIG. 8D. Finally, the trivariate strip, from FIG. 8D, is populated with tiles in the shape of stitches to model the internal stitched fibers, as is shown in FIG. 8E and FIG. 8F (a zoom-in).

Figure 9A:
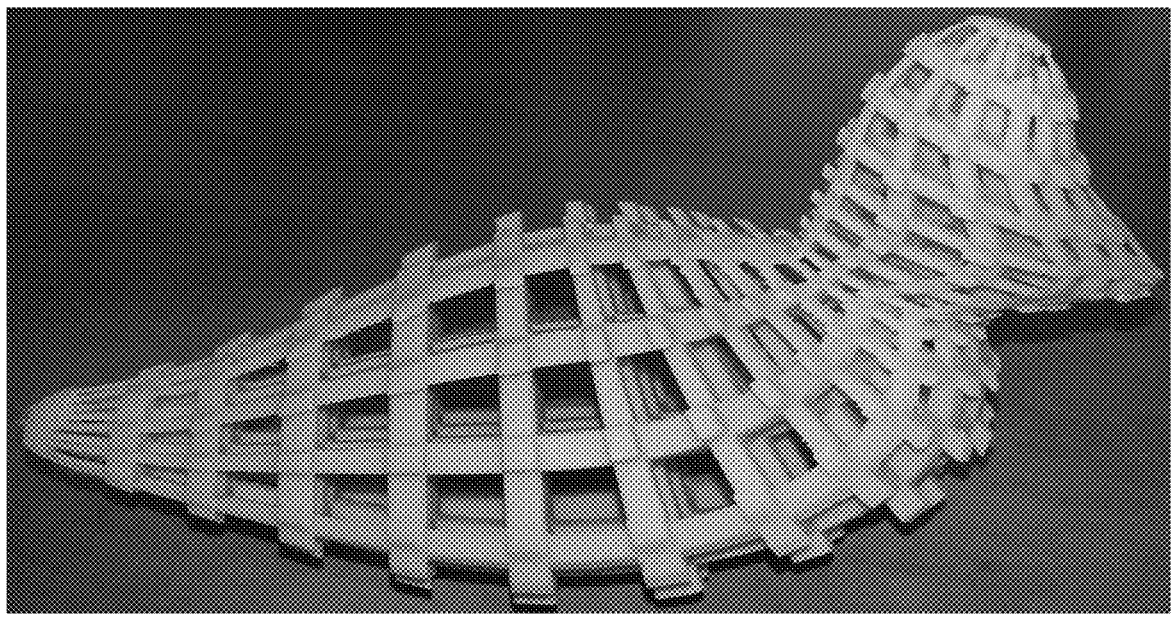
FIGS. 9A-9B. Photographs of the 3D printed (9A) porous duck from FIG. 2, and (9B) porous torus from FIG. 5.
Figure 9B:
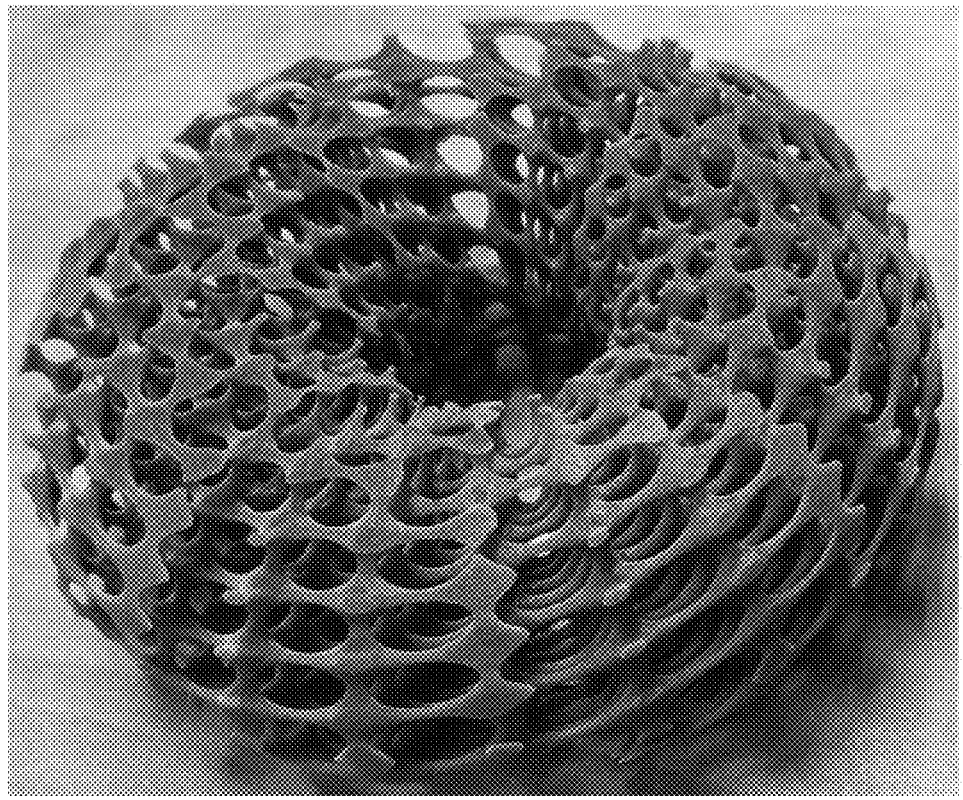

Finally, and as a testimony for the viability of the constructed models and their watertightness, FIGS. 9A-B present two of the presented examples 3D-printed using additive manufacturing.

Curve-Trivariate

Figure 10A:
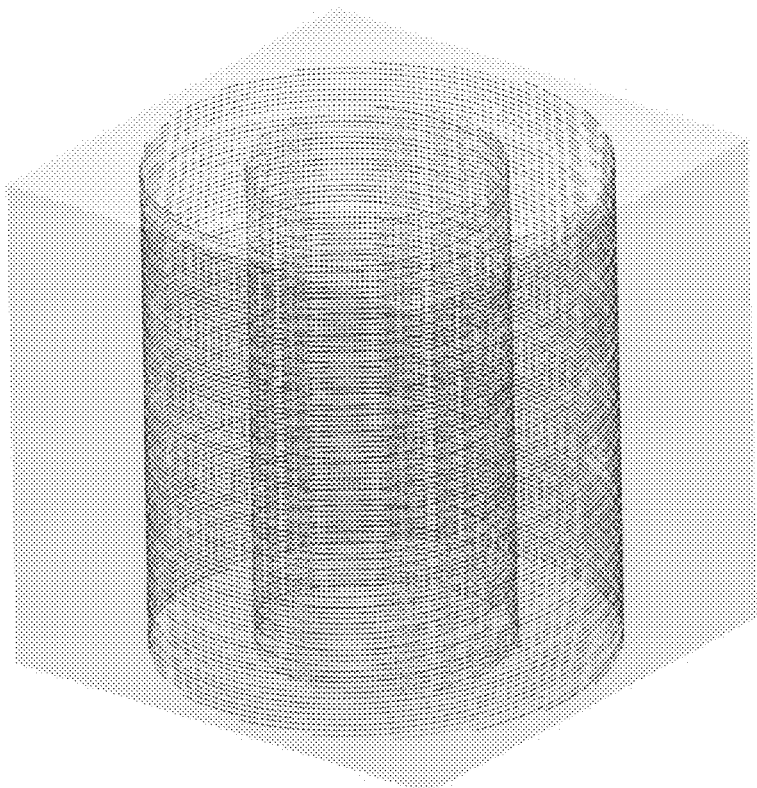
FIGS. 10A-10B. Images of two sets of concentric helical curves (10A) embedded in the domain of the trivariate, then (10B) curve-trivariate composed in a trivariate duck model.
Figure 10B:
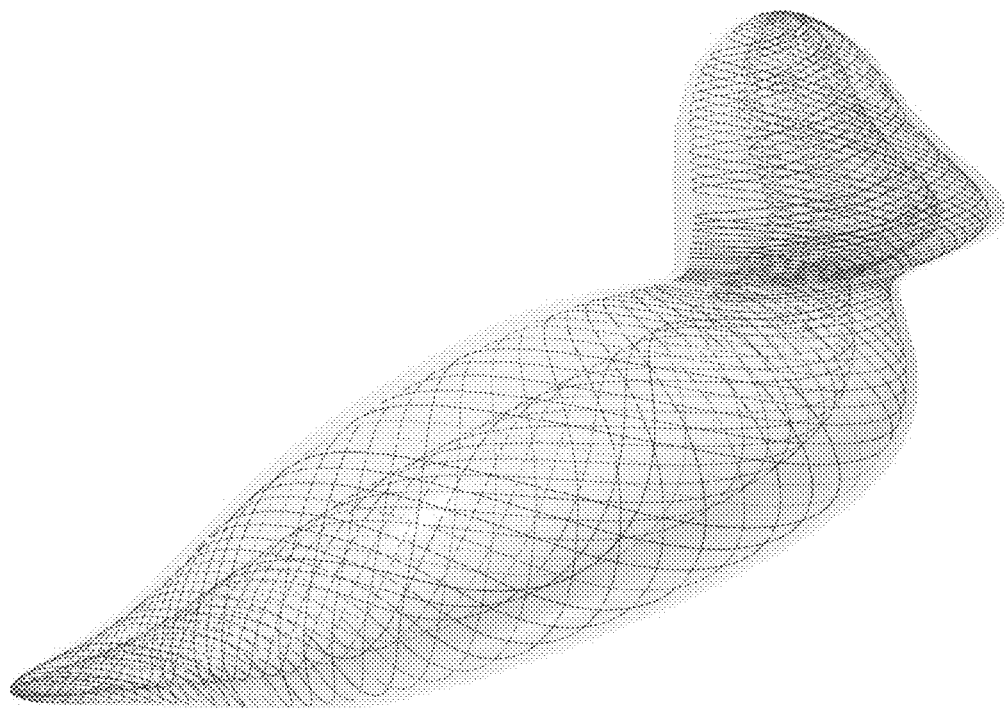

Curve-trivariate composition can also play a role in the placement of fibers, in the modeling of composites. Curves can be embedded in the domain of the mapping trivariate, M, only to be mapped to Euclidean space via curve-trivariate composition. Because M is unlikely to be an isometric mapping, one might be required to compensate for the distances between adjacent curves in the domain of M so the mapped curves are more equally spaced in Euclidean space. FIGS. 10A-B show one such example, where helical curves are mapped through T to yield the Euclidean space curves. The result is a set of univariates, through which, one can, for example, sweep any cross section to precisely yield fibers of that cross section.

Structures Toward Isogeometric Analysis (IGA)

Figure 11A:
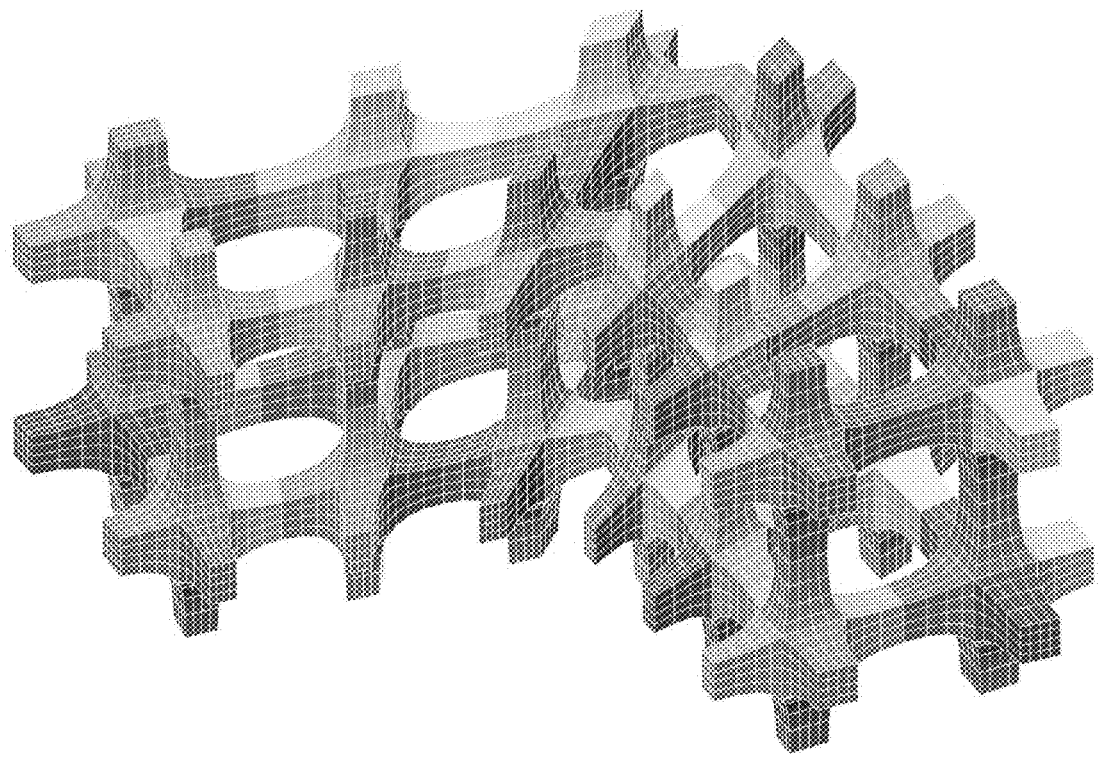
FIGS. 11A-11B. Two examples of micro-structures consisting of trivariate B-spline functions (each trivariate in a different color) that were created using trivariate-trivariate composition, possibly toward Isogeometric Analysis (IGA). (11A) 168 trivariate Bezier elements of orders (4,4,7). (11B) 336 trivariate Bezier elements of orders (5,5,9).
Figure 11B:
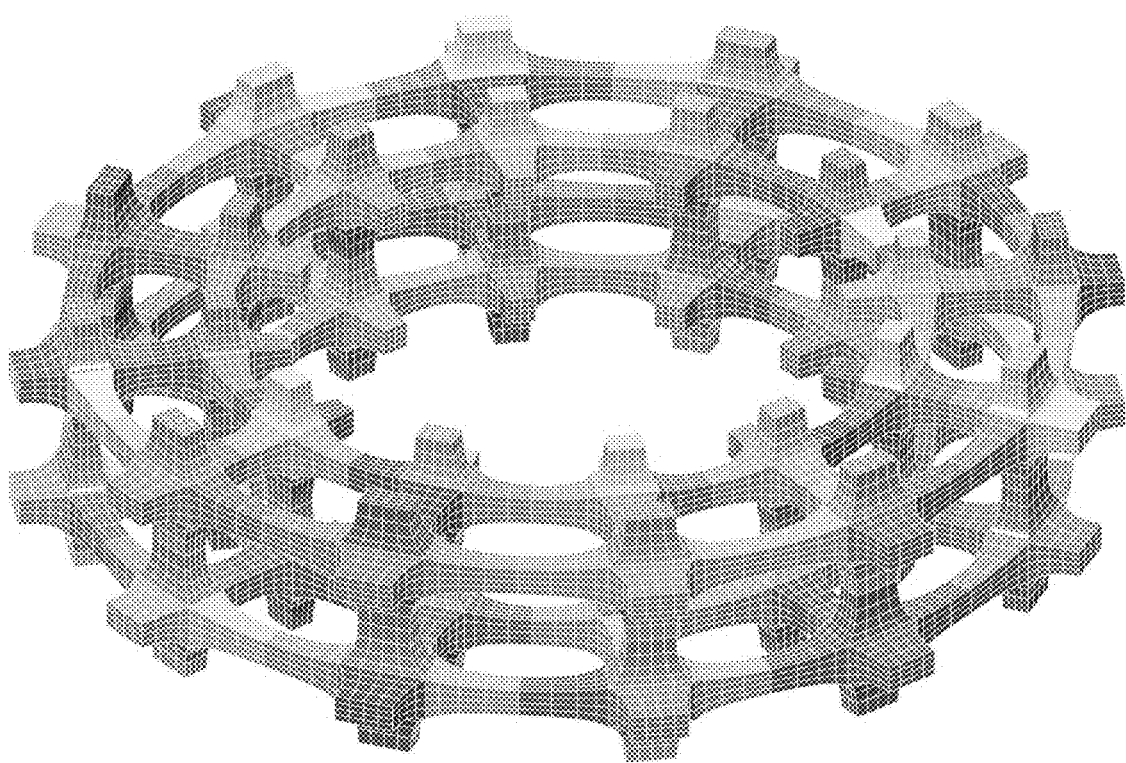

We have already shown that trivariate-trivariate composition is viable. One can also use trivariate-trivariate composition to construct volumetric micro-structures toward Isogeometric Analysis (IGA). FIGS. 11A-B show two structures of trivariate B-spline functions, created using the presented trivariate-trivariate composition. Each trivariate in FIG. 11 is differently colored.

Quality/Smoothness of the Results

The complexity of the result deserves some considerations. The composition operations in FIG. 1 employed a tile that consists of a cubic curve, a cubic by quadratic surface, and a trivariate of degrees (3,3,2). The mapping function was a trivariate Bézier of degrees (1,1,3).

A direct mapping of control points will ends up with the same degrees as the input. On the other hand, the smooth result, of FIG. 1D, of the precise composition mapping, resulted in deformed curves of degree 15, deform surfaces of degrees (15,10) and deformed trivariates of degrees (15,15, 10).

Recall Equation (1). Given a trivariate T of degrees ($n_1$, $n_2$, $n_3$) and a surface S of degrees ($m_1$, $m_2$), the degrees of the composition surface T (S) are $$(n_1 m_1 + n_2 m_1 + n_3 m_1, n_1 m_2 + n_2 m_2 + n_3 m_2). \quad (7)$$

For the surface case of FIG. 1, Equation (7) indeed yields the degrees of $$(1 \times 3 + 1 \times 3 + 3 \times 3, 1 \times 2 + 1 \times 2 + 3 \times 2) = (15, 10).$$

Figure 12:
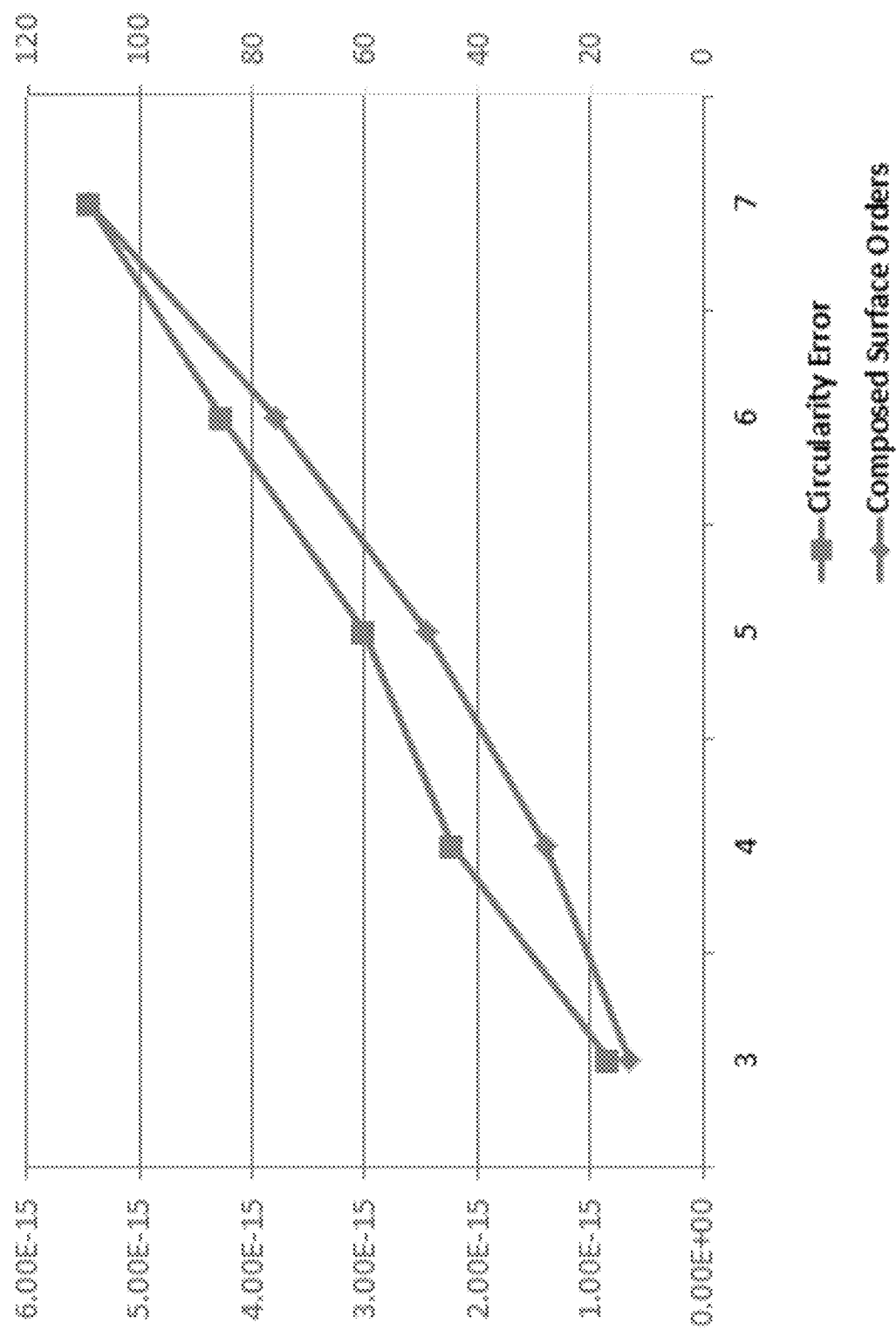
FIG. 12. Line graph of the error in circularity due to high order composition. Given a unit cube polynomial trivariate, M, of a tri-order d, and a rational cylinder surface of unit size, S, of bi-order d, the error in the circularity of M(S) is examined and shown in red as a function of d. Also shown is the bi-order of M(S) in blue.

Clearly, the degrees can be higher and as a second example, in FIG. 4, the tile consists of four surfaces of degrees (3×3), and the trivariate knot is of degrees (3×3×3). The composed surface elements are of degrees (27×27) (and lengths (109×163)). That said, and beyond the computation overhead that these high degrees poses, we have detected no instability difficulties for degrees below one hundred, including with rational forms (FIG. 12). Rational input will yield rational output but in the same degrees as the polynomials case. FIG. 12 exemplifies this observed stability. Given a unit cube polynomial trivariate, M, of a tri-order d and a rational cylinder surface of unit size, S, of bi-order d, we examined the error in the circularity of cylinder M(S) (measured as the distance deviation from the axis of the cylinder) as a function of d. As can be seen in the figure, the error remains very small and its growth is approximately linear with the orders. Finally, one may consider degree reduction approximation to M(S) to simplify the computation.

Since the geometry that is synthesized in this work is typically deformed, the need for precise rational circular arcs is diminished. While we do support compositions of rational forms, in all other presented examples in this work, polynomial forms were used.

All the micro-structure models presented in this work were created in seconds to minutes. Measured on an 2.8 GHz i7 laptop running Windows 10, the example in FIG. 2 synthesized 256=(4×4×16) tiles (each consisting of 6 bilinear surfaces) in a little over a minute. The example in FIG. 4C synthesized 47 tiles (each consisting of 4 helical surfaces) in around 20 seconds. Finally, the example in FIG. 11B synthesized 48 tiles (each consisting of 7 trivariates, 336 Bézier elements in all) in around 5 seconds.

Both inputs, the tile and/or the mapping trivariate, M, can be singular, in which case the constructed micro-structure is likely to be singular as well. However, verifying the regularity of either the tile or M is fairly simple by computing and bounding the magnitude of their Jacobian. For M(x, y, z), this amounts to the (spline) product of:

$$|J| = \left(\frac{\partial M}{\partial x} \times \frac{\partial TM}{\partial y}, \frac{\partial M}{\partial z}\right),$$

and verifying that |J| never vanish, for example, by verifying that all the spline coefficients of |J| are of the same sign.

In all examples presented and due to M, different local scale factors are applied to different tiles in the output geometry. This clear limitation stems from the fact that the deformation trivariate function is rarely isometric. One can only establish bounds on the different scale factors, by computing the field of the first fundamental form of the deforming trivariate, as spline functions, and bound their range.

Because every tile is likely to be deformed a bit differently from other tiles, if some local properties are to be preserved, some extra measures must be taken into considerations. Consider the example in FIG. 8. While the original tile could have been synthesized using a highly accurate circular cross section, the mapped/deformed result in FIG. 8F is likely to violate that circularity. However, one can deform an axial curve of the tile's circular geometry, using curve-trivariate composition (i.e. FIG. 10), only to sweep a circular cross section through the deform axial curve, using a regular sweep surface operator. Here, the result will be stitches that are circular as precise as desired (and allowed by the sweep operation).

In this work, we uniformly paved tiles in the domain of the mapping FFD. However, and as already stated, especially for B-spline FFDs, this can result in unequally stretched tiles. While the notion of arc-length is difficult to extend from curves to surfaces and trivariates, one can still devise a scheme to try to equalize the stretch in the mapping M, via a domain reparametrization, before the paving process takes place. Indeed, the internal parameterization of M can have a grand affect on the distribution of the tiles in the structure and is a degree of freedom to further investigate and employ.

Having fairly complex tiles, paving and mapping them numerous times can require an intense amount of memory (and computing power). While unavoidable at times, one can consider a lazy synthesis of the geometry on the fly and as needed in real time, possibly with the help of parallel computing. Further, one can take advantage of the inherent hierarchy and given local geometric operations (like slicing), converge rapidly and process/synthesize only these micro-structure's tiles that are active and affect the local geometry (intersect with the slicing plane). Similarly, if tiles are (trimmed) freeform shapes, their tessellation into polygons might also be done on the fly and by demand, again with the possible help of GPUs or parallel computing. This potential difficulty of large memory and computing needs is likely to play a role also in analysis of porous geometry, while part of the difficulties in the analysis might be alleviated via homogenization of the structure.

In all examples, by definition, the deforming function was a tensor product trivariates and the tiles were cuboids aligned along the main axes, in a cube-like topology. Use of trimmed trivariates has already proposed, and herein, in order to support T mapping using trimmed trivariates, tiles that intersect with the trimming domain must be properly pruned or sealed. Further, considering an interior trimming boundary in some volumetric model, between two trimmed trivariates must also be addressed for example as shown in Massarwi, et al., 2016, A b-spline based framework for volumetric object modeling, *Computer Aided Design* 78, 36-47, herein incorporated by reference. Conceptually, there might be no need to prune tiles that are completely inside the volumetric model, even when they cross interior trimming boundaries, while matching the boundaries of the tiles along these interior trimming boundaries will be required. Proper, whatever that means, treatment of tiles in such a trimmed volumetric environment is still an open question, including the proper management of continuity across interior trimming surfaces.

Non-tensor product FFDs have already been proposed, as Extended FFDs. Use of Extended FFDs or other mappings, instead of the tensor product trivariates employed herein, will allow one to support micro-structures that are not necessarily of cuboid topology. Further, the tiles themselves are not confined to cube-like topology, and any tile that periodically paves 3-space can be used. Examples include hexagonal prisms or tetrahedra tiles, possibly embedded in a large hexagonal prism or tetrahedra deformation function. Alternatives to tensor product trivariates should be explored as mapping function and those can include splines over general triangulations or box-splines. Moreover, any tiling of 3-space can be used and semi-regular tiling, where two (or more) differently shaped tiles are employed together, is another example.

The presented micro-structures' construction scheme can be further refined and improved in additional directions. Attributes like colors or texture can be mapped to the resulting geometry where the attributes' specifications can either be local, coming from the tile itself and repeated for all tiles, or be global as a specification over the mapping trivariate.

Herein, the same tile was used throughout the pavement of a deforming trivariate. Alternatively, one can select each tile out of a (predetermined or created on the fly) random (set of) tile, resulting in a randomly looking porous geometry. Further, if certain physical constraints apply, such as local stress fields or heat transfer considerations, the synthesized tiles can obey such constraints and locally adapt their shape to optimally satisfy these constraints while preserving continuity conditions between tiles. The preservation of continuity can be performed incrementally and on the fly, by using, for random tile at indices (ijk), the boundary conditions of previously constructed random tiles (i−1, j, k), (i, j−1, k), and (i, j, k−1), if any, along their shared boundaries.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for generating instructions for manufacturing a multi-dimensional object, comprising operating at least one hardware processor for:
   receiving a deformation map of a multi-dimensional model of said object,
   wherein said deformation map is represented as a polynomial or rational spline denoted M;
   receiving a multi-dimensional model of a tile,
   wherein said tile is represented as a polynomial or rational spline denoted T;

paving multiple ones of said tile in the interior domain of said deformation map to create a tile arrangement, to fill at least a portion of the inner volume of the domain of said deformation map;

creating a representation of a microstructure of the multi-dimensional object denoted M' that is suitable for manufacturing by mathematically functionally composing the tile arrangement within said at least a portion of the inner volume of the domain of said deformation map with the deformation map denoted M'=M(T); and providing code instructions for execution by a manufacturing apparatus controller of a manufacturing apparatus for manufacturing the representation of the microstructure of said multi-dimensional model.

2. The method of claim 1, wherein said receiving of the multi-dimensional model comprises receiving a multi-dimensional boundary model of said object and converting said multi-dimensional boundary model of said object into said multi-dimensional model.

3. The method of claim 1, wherein said multi-dimensional model is a non-grid topology extended free form deformation (FFD).

4. The method of claim 1, further comprising:
   a. mathematical function composition with said multi-dimensional model; or
   b. mathematical points and vertices mapping of said set of paved tiles through said multi-dimensional model.

5. The method of claim 1, wherein said multi-dimensional model of the tile comprises a multi-dimensional model of a microstructure to be repeated within the volume of said multi-dimensional object.

6. The method of claim 1, wherein said multi-dimensional tile is heterogeneous.

7. The method of claim 1, wherein said multi-dimensional tile comprises a univariate curve, a trimmed bivariate surface, bivariate surface, a trimmed trivariate volume, a trivariate volume, a polyline, a polygon, a voxel, a tetrahedron or any combination thereof.

8. The method of claim 1, wherein said multi-dimensional tile models at least one of color, texture, a material and a combination thereof.

9. The method of claim 1, wherein said tile is a periodic tile, wherein the minimum and maximum of a dimension of said tile are equal.

10. The method of claim 1, wherein said paving is periodic paving and comprises direct contact between adjacent tiles.

11. The method of claim 1, further comprising, closing a tile placed upon a boundary of said multi-dimensional model along said boundary.

12. The method of claim 11, wherein said closing comprises performing Boolean set operations.

13. The method of claim 11, wherein said closing is performed before said paving.

14. The method of claim 11, wherein said modeling comprises producing a watertight model.

15. The method of claim 1, further comprising tessellation of said tile into a polygon.

16. The method of claim 1, wherein said multi-dimensional filled model comprises a digital representation of at least two materials.

17. The method of claim 1, wherein said creating the representation of the microstructure comprises building a smooth multi-dimensional geometry without discontinuity.

18. The method of claim 1, wherein paving of multiple ones of said tile forms a regular, semi-regular or general tiling of multi-dimensional space.

19. The method of claim 1, wherein said paving comprises crossing a knot line in said multi-dimensional model and subdividing a tile at said crossed knot line.

20. The method of claim 1, wherein a shape of a paved tile varies across said multi-dimensional model, wherein said shape of said tile is set to follow at least one physical constraint on the multi-dimensional model by optimizing or analyzing said model for said physical constraint.

21. The method of claim 20, wherein said optimizing or analyzing said model for said physical constraint comprises at least one of stress analysis, heat transfer analysis and shape optimization.

22. The method of claim 1, further comprising: (a) transmitting the multi-dimensional filled model to the manufacturing apparatus controller of the manufacturing apparatus, and (b) producing said multi-dimensional object from said multi-dimensional filled model, by the manufacturing apparatus.

23. The method of claim 22, wherein said manufacturing apparatus is selected from the group consisting of: an apparatus for additive manufacturing, and an apparatus for composite manufacturing.

24. The method of claim 1, wherein the deformation map and the tile are implemented from the group consisting of: non-trimmed Bézier parametric splines, non-trimmed B-spline parametric splines, trimmed Bézier parametric splines, and trimmed B-spline parametric splines.

25. A computer program product for generating instructions for manufacturing a multi-dimensional object, comprising a non-transitory computer-readable storage medium having program code embodied thereon, the program code executable by at least one hardware processor to:
   receive a deformation map of a multi-dimensional model of said object,
   wherein said deformation map is represented as a polynomial or rational spline denoted M;
   receive a multi-dimensional model of a tile,
   wherein said tile is represented as a polynomial or rational spline denoted T;
   pave multiple ones of said tiles in the interior domain of said deformation map to create a tile arrangement, to fill at least a portion of the inner volume of the domain of said deformation map;
   creating a representation of a microstructure of the multi-dimensional object denoted M' that is suitable for manufacturing by mathematically functionally composing the tile arrangement within said at least a portion of the inner volume of the domain of said deformation map with the deformation map denoted M'=M(T); and
   provide code instructions for execution by a manufacturing apparatus controller of a manufacturing apparatus for manufacturing the representation of the microstructure of said multi-dimensional model.

26. A system for manufacturing a multi-dimensional object, comprising:
   a. a hardware processor;
   b. a storage medium comprising the computer program product of claim 25; and
   c. the manufacturing apparatus capable of manufacturing a multi-dimensional object from said multi-dimensional filled model embodied in a digital file.

27. A method for modeling a multi-dimensional object, comprising operating at least one hardware processor for:

receiving a deformation map of a multi-dimensional model of said object,
wherein said deformation map is represented as a polynomial or rational spline denoted M;
receiving a multi-dimensional model of a tile;
wherein said tile is represented as a polynomial or rational spline denoted T;
paving multiple ones of said tile in the interior domain of said deformation map to create a tile arrangement, to fill at least a portion of the inner volume of the domain of said deformation map;
creating a representation of a microstructure of the multi-dimensional object denoted M' by mathematically functionally composing the tile arrangement with the deformation map denoted M'=M(T); and
providing the representation of the microstructure of said multi-dimensional model.

* * * * *